United States Patent
Lu et al.

(10) Patent No.: US 11,046,370 B2
(45) Date of Patent: Jun. 29, 2021

(54) WOOD FLOORING WITH REINFORCED THERMOPLASTIC UNDERLAYER

(71) Applicant: ROCKLAND FLOORING LLC, Red Wing, MN (US)

(72) Inventors: Ziqiang Lu, Red Wing, MN (US); Marc Chorney, Hastings, MN (US)

(73) Assignee: Rockland Flooring LLC, Red Wing, MN (US)

( * ) Notice: Subject to any disclaimer, the term of this patent is extended or adjusted under 35 U.S.C. 154(b) by 90 days.

(21) Appl. No.: 16/661,610

(22) Filed: Oct. 23, 2019

(65) Prior Publication Data
US 2020/0055550 A1    Feb. 20, 2020

Related U.S. Application Data

(63) Continuation of application No. 15/874,419, filed on Jan. 18, 2018, now Pat. No. 10,464,616, which is a (Continued)

(51) Int. Cl.
*B62D 29/02* (2006.01)
*B32B 7/12* (2006.01)
(Continued)

(52) U.S. Cl.
CPC .............. *B62D 29/02* (2013.01); *B32B 5/12* (2013.01); *B32B 7/12* (2013.01); *B32B 21/10* (2013.01); *B62D 25/2054* (2013.01); *B65D 90/026* (2013.01); *B32B 2262/101* (2013.01); *B32B 2307/546* (2013.01); *B32B 2307/7265* (2013.01); *B32B 2605/00* (2013.01); *B65D 88/121* (2013.01)

(58) Field of Classification Search
CPC .. B62D 29/02; B62D 25/2054; B65D 90/026; B65D 88/121; B32B 7/12; B32B 21/10; B32B 5/12; B32B 2307/7265; B32B 2307/546; B32B 2262/101; B32B 2605/00
USPC ...................................... 296/184.1
See application file for complete search history.

(56) References Cited

U.S. PATENT DOCUMENTS 3,111,569 A   11/1963  Rubenstein
4,212,405 A   7/1980   Schmidt
(Continued)

FOREIGN PATENT DOCUMENTS

CA     2275848 A1    12/2000

OTHER PUBLICATIONS

Havco Wood Flooring, "Our Composite Flooring," 1-page Product Article from HAVCO Website at: http://www.havcowp.com/products/composite-flooring, Sep. 27, 2012.
(Continued)

*Primary Examiner* — Pinel E Romain
(74) *Attorney, Agent, or Firm* — Seager, Tufte & Wickhem LLP

(57) ABSTRACT

An example reinforced wood flooring for use in forming a truck trailer or container floor may include a wood member. The wood member may include a plurality of wood strips that are attached together. The wood member may also have a top surface and a bottom surface. An essentially water impermeable fiber-reinforced thermoplastic underlay may be adhered to the bottom surface of the wood member.

20 Claims, 9 Drawing Sheets

Related U.S. Application Data continuation of application No. 15/230,830, filed on Aug. 8, 2016, now Pat. No. 9,878,744, which is a continuation of application No. 14/728,483, filed on Jun. 2, 2015, now Pat. No. 9,434,421.

(51) Int. Cl.
| | |
|---|---|
| B62D 25/20 | (2006.01) |
| B32B 5/12 | (2006.01) |
| B65D 90/02 | (2019.01) |
| B32B 21/10 | (2006.01) |
| B65D 88/12 | (2006.01) |

(56) References Cited

U.S. PATENT DOCUMENTS

| | | |
|---|---|---|
| 4,471,012 A | 9/1984 | Maxwell |
| 4,526,418 A | 7/1985 | Martin |
| 4,703,948 A | 11/1987 | Ehrlich |
| 4,810,027 A | 3/1989 | Ehrlich |
| 4,881,859 A | 11/1989 | Ehrlich |
| 4,913,485 A | 4/1990 | Moffatt et al. |
| 4,958,472 A | 9/1990 | Ehrlich |
| 4,969,659 A | 11/1990 | Ehrlich |
| 5,083,834 A | 1/1992 | Moffatt et al. |
| 5,152,228 A | 10/1992 | Donkin |
| 5,218,794 A | 6/1993 | Ehrlich |
| 5,221,103 A | 6/1993 | Ehrlich |
| 5,255,952 A | 10/1993 | Ehrlich |
| 5,283,102 A | 2/1994 | Sweet et al. |
| 5,297,858 A | 3/1994 | Zupan |
| 5,318,335 A | 6/1994 | Ehrlich |
| 5,439,266 A | 8/1995 | Ehrlich |
| 5,509,715 A | 4/1996 | Scharpf |
| 5,536,036 A | 7/1996 | Ehrlich |
| 5,537,931 A | 7/1996 | Donkin |
| 5,538,330 A | 7/1996 | Ehrlich |
| 5,562,981 A | 10/1996 | Ehrlich |
| 5,601,033 A | 2/1997 | Ehrlich et al. |
| 5,607,200 A | 3/1997 | Smidler |
| 5,622,115 A | 4/1997 | Ehrlich et al. |
| 5,664,826 A | 9/1997 | Wilkens |
| 5,685,228 A | 11/1997 | Ehrlich et al. |
| 5,730,485 A | 3/1998 | Sjostedt et al. |
| 5,730,578 A | 3/1998 | Smidler |
| 5,752,791 A | 5/1998 | Ehrlich |
| 5,752,798 A | 5/1998 | Smidler |
| 5,774,972 A | 7/1998 | Ehrlich |
| 5,832,836 A | 11/1998 | Ehrlich et al. |
| 5,860,693 A | 1/1999 | Ehrlich |
| 5,863,091 A | 1/1999 | Shepherd et al. |
| 5,876,089 A | 3/1999 | Ehrlich |
| 5,897,174 A | 4/1999 | Ehrlich |
| 5,928,735 A | 7/1999 | Padmanabhan et al. |
| 5,938,274 A | 8/1999 | Ehrlich |
| 5,952,076 A | 9/1999 | Foster |
| 5,997,076 A | 12/1999 | Ehrlich |
| 6,170,897 B1 | 1/2001 | Karrer |
| 6,179,942 B1 | 1/2001 | Padmanabhan |
| 6,183,824 B1 | 2/2001 | Padmanabhan et al. |
| 6,318,794 B1 | 11/2001 | Bérubé |
| 6,336,265 B1 | 1/2002 | Niedermair |
| 6,497,937 B1 | 12/2002 | Lam et al. |
| 6,505,883 B1 | 1/2003 | Ehrlich |
| 6,558,765 B2 | 5/2003 | Padmanabhan |
| 6,558,766 B2 | 5/2003 | Padmanabhan et al. |
| 6,601,357 B2 | 8/2003 | Tunis |
| 6,607,803 B2 | 8/2003 | Foster |
| 6,662,424 B2 | 12/2003 | Ehrlich |
| 6,824,341 B2 | 11/2004 | Ehrlich |
| 6,843,877 B2 | 1/2005 | Risi |
| 6,870,473 B2 | 3/2005 | Brown, Jr. |
| 6,886,870 B2 | 5/2005 | Ehrlich |
| 6,920,721 B2 | 7/2005 | Johns et al. |
| 6,957,675 B2 | 10/2005 | Risi |
| 6,986,546 B2 | 1/2006 | Ehrlich |
| 7,069,702 B2 | 7/2006 | Ehrlich |
| 7,100,971 B2 | 9/2006 | Pines |
| 7,114,762 B2 | 10/2006 | Smidler |
| 7,134,820 B2 | 11/2006 | Ehrlich |
| D573,874 S | 7/2008 | Thoma et al. |
| 7,500,713 B2 | 3/2009 | Riley et al. |
| 7,527,309 B2 | 5/2009 | Smidler |
| 7,588,286 B2 | 9/2009 | Lewallen et al. |
| 7,637,558 B2 | 12/2009 | Risi |
| 7,677,642 B2 | 3/2010 | Wylezinski |
| 7,722,112 B2 | 5/2010 | Ehrlich |
| D619,505 S | 7/2010 | Thoma et al. |
| 7,762,618 B2 | 7/2010 | Lewallen et al. |
| 7,765,758 B2 | 8/2010 | Chorney et al. |
| 7,862,103 B2 | 1/2011 | Riley et al. |
| 7,878,574 B2 | 2/2011 | Thoma et al. |
| 7,926,524 B2 | 4/2011 | Risi |
| 7,931,328 B2 | 4/2011 | Lewallen et al. |
| 7,972,707 B2 | 7/2011 | Padmanabhan |
| 8,006,386 B2 | 8/2011 | Ehrlich |
| 8,016,527 B2 | 9/2011 | Pattison et al. |
| 8,025,331 B2 | 9/2011 | Ehrlich et al. |
| 8,029,880 B2 | 10/2011 | Liu |
| 8,079,793 B2 | 12/2011 | Thoma et al. |
| 8,091,952 B2 | 1/2012 | Risi |
| 8,100,465 B2 | 1/2012 | Wylezinski |
| 8,337,994 B2 | 12/2012 | Padmanabhan |
| 8,789,332 B1 | 7/2014 | Halliley et al. |
| 8,857,125 B2 | 10/2014 | Lu et al. |
| 8,950,144 B2 | 2/2015 | Padmanabhan |
| 9,434,421 B1 | 9/2016 | Lu et al. |
| 9,695,601 B2 * | 7/2017 | Whispell ............ E04F 15/0215 |
| 9,744,753 B2 | 8/2017 | Sheffield et al. |
| 2001/0003623 A1 | 6/2001 | Padmanabhan et al. |
| 2001/0035264 A1 | 11/2001 | Padmanabhan |
| 2002/0050116 A1 | 5/2002 | Tunis |
| 2003/0134080 A1 | 7/2003 | Foster |
| 2005/0042432 A1 | 2/2005 | Jones et al. |
| 2005/0266200 A1 | 12/2005 | Padmanabhan |
| 2006/0101754 A1 | 5/2006 | Risi |
| 2006/0179733 A1 | 8/2006 | Padmanabhan |
| 2007/0193179 A1 | 8/2007 | Risi |
| 2009/0193747 A1 | 8/2009 | Chorney et al. |
| 2009/0269522 A1 | 10/2009 | Liu |
| 2009/0280346 A1 | 11/2009 | Risi |
| 2010/0035017 A1 | 2/2010 | Green |
| 2010/0295334 A1 | 11/2010 | Chorney et al. |
| 2011/0179740 A1 | 7/2011 | Padmanabhan |
| 2011/0223328 A1 | 9/2011 | Padmanabhan |
| 2011/0291441 A1 | 12/2011 | Burton |
| 2013/0014464 A1 | 1/2013 | Risi et al. |
| 2013/0115412 A1 | 5/2013 | Padmanabhan |
| 2013/0207413 A1 | 8/2013 | Lookebill et al. |
| 2013/0313857 A1 | 11/2013 | Lu |
| 2014/0000201 A1 | 1/2014 | Lu et al. |
| 2014/0295131 A1 | 10/2014 | Pilpel |
| 2015/0076861 A1 | 3/2015 | Padmanabhan |
| 2015/0165731 A1 | 6/2015 | Pilpel et al. |
| 2015/0203160 A1 | 7/2015 | Peterson et al. |
| 2015/0224670 A1 | 8/2015 | Sheffield et al. |
| 2015/0239507 A1 | 8/2015 | Padmanabhan et al. |
| 2015/0239508 A1 | 8/2015 | Padmanabhan et al. |
| 2016/0096351 A1 | 4/2016 | McDonald, Jr. et al. |
| 2017/0247063 A1 | 8/2017 | Banerjee et al. |

OTHER PUBLICATIONS

Havco Wood Flooring, "Laminated Flooring," 1-page Product Article from HAVCO Website at: http://www.havcowp.com/products/laminated-oak-flooring, Sep. 27, 2012.

"Non-Phthalate Plasticizer for Polyvinyl Acetate (PVAc) Emulsion Adhesives in Woodworking and Bookbinding," Eastman Chemical Company, Eastman TXIBtm Formulation Additive, L-AP241A, Mar. 10, 2010.

Motohashi et al., "Temperature Dependency of Bond Strength of Polyvinyl Acetate Emulsion Adhesives for Woods," Wood and Fiber Science, vol. 16, No. 1, pp. 72-85, Apr. 2, 1980.

(56) References Cited

OTHER PUBLICATIONS

Knee, "Floor Makers Using New Materials, Designs to Meet Fleet Demands for Longer Trailer Life," Transport Topics Online, Website: http://www.ttnews.com/articles/printonpt.aspx?storyid-28148, pp. 1-4, printed Feb. 17, 2012.

Sellers, Jr., "Wood Adhesive Innovations and Applications in North America," Forest Products Journal, vol. 51, No. 3, pp. 12-22, Jun. 2001.

Belleville et al., "Wood-Adhesive Interface Characterization and Modeling in Engineered Wood Flooring," Wood and Fiber Science, vol. 40, No. 4, pp. 484-494, 2008.

"Rockland's Recommendations for Sealing Trailer Floors," Rockland Flooring, pp. 1-10, Nov. 24, 2015.

\* cited by examiner

US 11,046,370 B2

WOOD FLOORING WITH REINFORCED THERMOPLASTIC UNDERLAYER

CROSS-REFERENCE TO RELATED APPLICATION

This application is a continuation of U.S. patent application Ser. No. 15/874,419, filed Jan. 18, 2018, which is a continuation of U.S. patent application Ser. No. 15/230,830, filed Aug. 8, 2016, now U.S. Pat. No. 9,878,744, which is a continuation of U.S. patent application Ser. No. 14/728,483, filed Jun. 2, 2015, now U.S. Pat. No. 9,434,421, the entire disclosure of which is hereby incorporated by reference.

TECHNICAL FIELD

The present disclosure pertains to reinforced wood flooring. More particularly, the present disclosure pertains to reinforced wood flooring for truck trailers and containers.

BACKGROUND

Conventional truck trailers may utilize a wood flooring, for example hardwood flooring, because of the desirable characteristics that the flooring may provide the trailer. For example, hardwood flooring may have a desirable level of strength, stiffness and hardness. Of the known wood floorings, each has certain advantages and disadvantages. There is an ongoing need to provide additional floorings and methods for making and using floorings.

SUMMARY

The disclosure describes design, material, manufacturing method, and use alternatives for reinforced floors for truck trailers and containers. An example reinforced wood flooring may include a wood member. The wood member may include a plurality of wood strips that are attached together. The wood member may also have a top surface and a bottom surface. An essentially water impermeable underlay may be adhered to the bottom surface of the wood member. Among fiber reinforced plastic (FRP) laminates, in some cases, fiber-reinforced thermoplastic (FRTP) laminates are more flexible in deflection than fiber-reinforced thermoset plastics (FRTSP) laminates at the same thickness and are lighter in weight (e.g., at the same thickness) but can provide significant improvements in flexural strength of the composite wood flooring. An FRTP laminate applied to an underside of the wood flooring can render the flooring essentially impermeable to water and other road contaminants. The reinforced floor may be used for truck trailers, containers, etc.

An example reinforced wood flooring is disclosed. The reinforced wood flooring comprises:
  a floor board having a bottom surface;
  wherein the floor board has a length of 16 feet or longer and is suitable for use in a truck trailer or container;
  an essentially water impermeable underlay attached to the bottom surface of the floor board, the underlay comprising a plurality of fibers disposed within a thermoplastic resin;
  wherein the underlay has a thickness of about 0.1 inches or less and is designed to enhance the strength of the floor board while simultaneously having a flexibility that allows the underlay to flex with the floor board substantially without separating from the floor board.

Alternatively or additionally to any of the embodiments above, the underlay is secured to the bottom surface of the floor board by adhesion.

Alternatively or additionally to any of the embodiments above, the plurality of fibers comprise fiberglass fibers.

Alternatively or additionally to any of the embodiments above, the underlay comprises about 70% or less by weight of fiberglass.

Alternatively or additionally to any of the embodiments above, the underlay has a flexural strength of about 140,000 psi or less along a length of the floor board and a flexural strength of about 60,000 psi or less along a width of the floor board.

Alternatively or additionally to any of the embodiments above, the underlay has a dyne level of 35 dyne/cm or more in surface energy.

Alternatively or additionally to any of the embodiments above, the plurality of fibers in the underlay are arranged in a plurality of layers including a first layer where a first portion of the plurality of fibers are substantially aligned along a length of the floor board and a second layer where a second portion of the plurality of fibers are substantially aligned along a width of the floor board.

Alternatively or additionally to any of the embodiments above, the plurality of layers in the underlay includes a third layer where a third portion of the plurality of fibers are substantially aligned along the length of the floor board.

Alternatively or additionally to any of the embodiments above, the floor board has a strength in a three point bending test that fails at a flexural load of about 2,000 to 12,000 pounds of force.

A flooring kit is disclosed. The flooring kit comprises:
  a plurality of floor boards, wherein each of the floor boards:
    has a length of 16 feet or longer and is suitable for use in a truck trailer or container,
    includes an essentially water impermeable underlay attached to a bottom surface of the floor board, the underlay comprising a plurality of fibers disposed within a thermoplastic resin, and
    wherein the underlay has a thickness of about 0.1 inches or less and is designed to enhance the strength of the floor board while simultaneously having a flexibility that allows the underlay to flex with the floor board substantially without separating from the floor board; and
  a binder securing together the plurality of floor boards.

Alternatively or additionally to any of the embodiments above, the kit further comprises a set of instructions for assembling the floor boards as a floor for the truck trailer or container.

Alternatively or additionally to any of the embodiments above, the underlay is secured to the bottom surface of the floor board by adhesion.

Alternatively or additionally to any of the embodiments above, the plurality of fibers comprise fiberglass fibers and wherein the underlay comprises about 70% or less by weight of fiberglass.

Alternatively or additionally to any of the embodiments above, the underlay has a flexural strength of about 140,000 psi or less along a length of the floor board and a flexural strength of about 60,000 psi or less along a width of the floor board.

Alternatively or additionally to any of the embodiments above, the underlay has a dyne level of 35 or more dyne/cm in surface energy.

Alternatively or additionally to any of the embodiments above, the plurality of fibers are arranged in plurality of layers including a first layer where a first portion of the plurality of fibers are substantially aligned along a length of the floor board and a second layer where a second portion of the plurality of fibers are substantially aligned along a width of the floor board.

Alternatively or additionally to any of the embodiments above, the plurality of layers includes a third layer where a third portion of the plurality of fibers are substantially aligned along the length of the floor board.

Alternatively or additionally to any of the embodiments above, each of the floor boards has a strength in a three point bending test that fails at a flexural load of about 2,000 to 12,000 pounds of force.

Alternatively or additionally to any of the embodiments above, each of the floor boards has a length of 45 to 53 feet and is suitable for use in a truck trailer.

A wood floor for a truck trailer is disclosed. The wood floor for a truck trailer comprises:

a plurality of floor boards, wherein each of the floor boards is formed from a plurality of wood strips, each of the wood strips being adhesively secured together along their side surfaces and being secured together along their end surfaces;

wherein each of the floor boards has a bottom surface;

wherein each of the floor boards has a length of 45 feet or longer;

an essentially water impermeable underlay attached to the bottom surface of each of the floor boards, the underlay comprising a plurality of fibers disposed within a thermoplastic resin;

wherein the underlay has a thickness about 0.1 inches or less and is designed to enhance the strength of the floor board while simultaneously having a flexibility that allows the underlay to flex with the floor board substantially without separating from the floor board;

wherein the underlay comprises about 70% or less by weight of fiberglass;

wherein the underlay has a flexural strength of about 140,000 psi or less along a length of each of the floor boards and a flexural strength of about 60,000 psi or less along a width of each of the floor boards; and wherein each of the floor boards has a strength in a three point bending test that fails at a flexural load of about 2,000 to 12,000 pounds of force.

The above summary of some embodiments is not intended to describe each disclosed embodiment or every implementation of the present invention. The Figures, and Detailed Description, which follow, more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
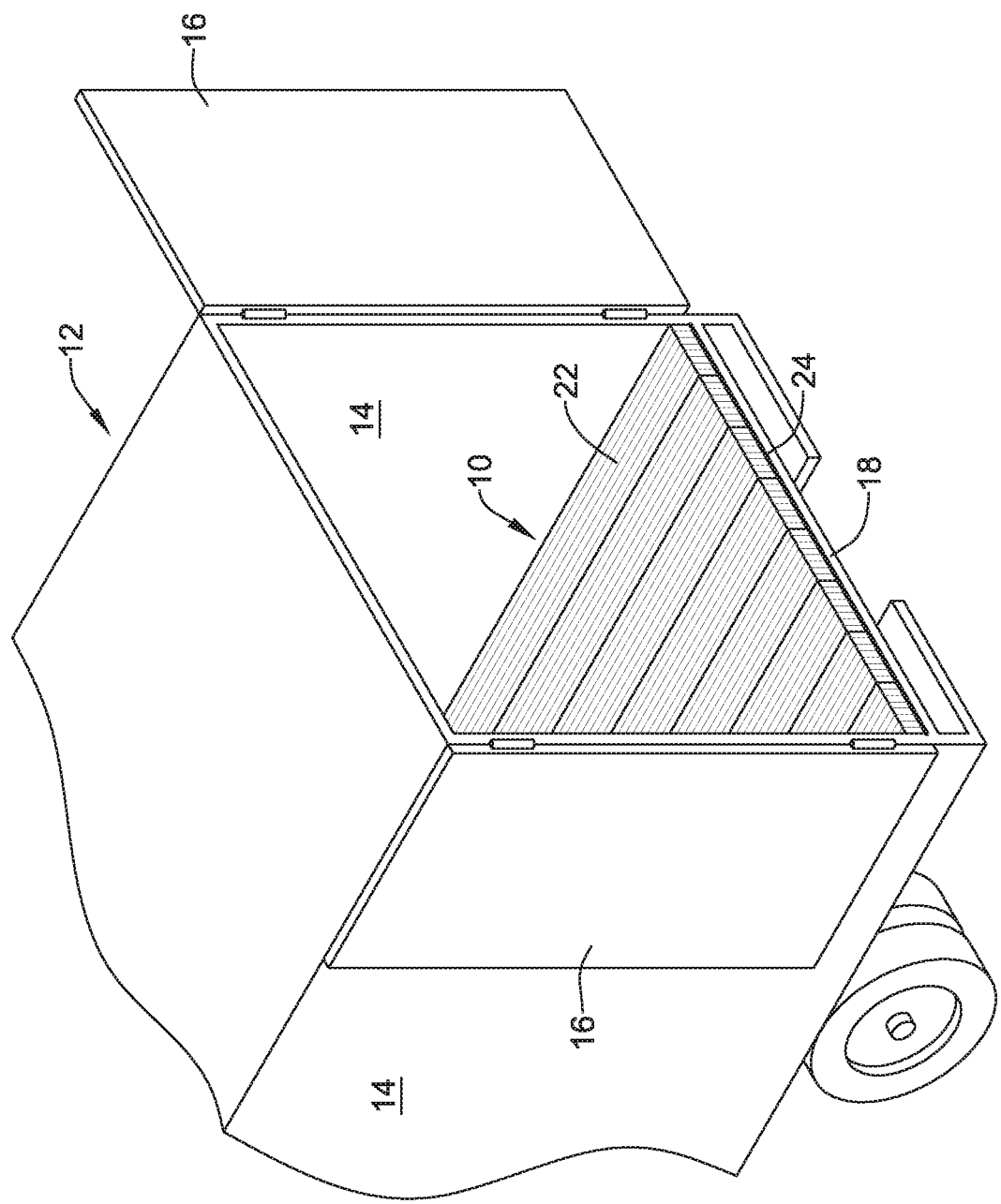
FIG. 1 is a perspective overview illustrating a reinforced floor disposed in a truck trailer.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

For the following defined terms, these definitions shall be applied, unless a different definition is given in the claims or elsewhere in this specification.

All numeric values are herein assumed to be modified by the term "about," whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

In some instances, use of the phrase "wood member" may refer to a laminated wood floor for trailers and containers. A laminated wood floor includes a plurality of laminated floorboards. As discussed herein, a reinforcing fiber may also be referred to simply as a fiber. A variety of reinforcing fibers may be used. In some cases, a reinforcing fiber may be a fiberglass fiber, which in some instances may be referred to simply as a glass fiber. Fiber reinforced plastics (FRP) refers generally to reinforced plastic materials, including but not limited to fiber-reinforced thermoplastics (FRTP). A thermoplastic is a matrix in FRTP and may also be called a thermoplastic resin or a resin. An FRP underlay refers to a FRP laminate which may be termed an FRTP laminate. It can also be called a reinforced underlay. For this disclosure, an FRP underlay is a fiber-reinforced sheet material and is also called FRP sheet. A composite floorboard may be a fiber-reinforced composite floorboard (e.g., an FRP-reinforced wood floorboard). Composite wood flooring or reinforced wood flooring may also be referred to as composite wood floorboards. A composite wood floorboard may also be called a composite floorboard or a composite board.

The following detailed description should be read with reference to the drawings in which similar elements in different drawings are numbered the same. The drawings, which are not necessarily to scale, depict illustrative embodiments and are not intended to limit the scope of the invention.

FIG. 1 is a perspective view of an example reinforced wood flooring 10. In this example, flooring 10 is disposed in a truck trailer 12. Although flooring 10 is illustrated within trailer 12, this is not intended to limit the invention as flooring 10 may be used, for example, with a number of different structures including containers (e.g., shipping and/or freight containers), railroad box cars, and the like, or any other suitable structure. Trailer 12 may be structurally similar to typical truck trailers known in the art. For example, trailer 12 may have a pair of opposing side walls 14 and end doors 16 that can open and close to provide access to the interior of trailer 12. In at least some embodiments, flooring 10 may extend across the width and along the length of the interior of trailer 12. Trailer 12 may have a plurality of support members 18 (e.g., "I" beams, "C" beams, hat sections, etc.) that each may have an upper flange or surface that crosses the width of trailer 12 and are spaced along the length of trailer 12. In some embodiments, flooring 10 may be secured to support member 18 by screws (not shown) or any other suitable fasteners, which may penetrate through the whole thickness of flooring 10 and the upper flange of support members 18.

As indicated above, flooring 10 may be a reinforced wood flooring. By virtue of being reinforced, flooring 10 may be designed to have a desirable level of strength, stiffness, and the like. This may be desirable for a number of reasons. For example, increased strength may allow flooring 10 to be more resistant to damage and/or wear, carry greater loads (e.g., increase payload), have a greater life, etc. Furthermore, by virtue of using a reinforcing structure (e.g., the "reinforcing underlay" such as underlay 24 described below) in flooring 10, other components of flooring 10 (e.g., the "wood member" such as wood member 22 described below) may be manufactured to be thinner, which may decrease the weight of flooring 10 and improve the fuel economy in trailers using flooring 10. Some additional details regarding these and other features can be found below.

Figure 2:
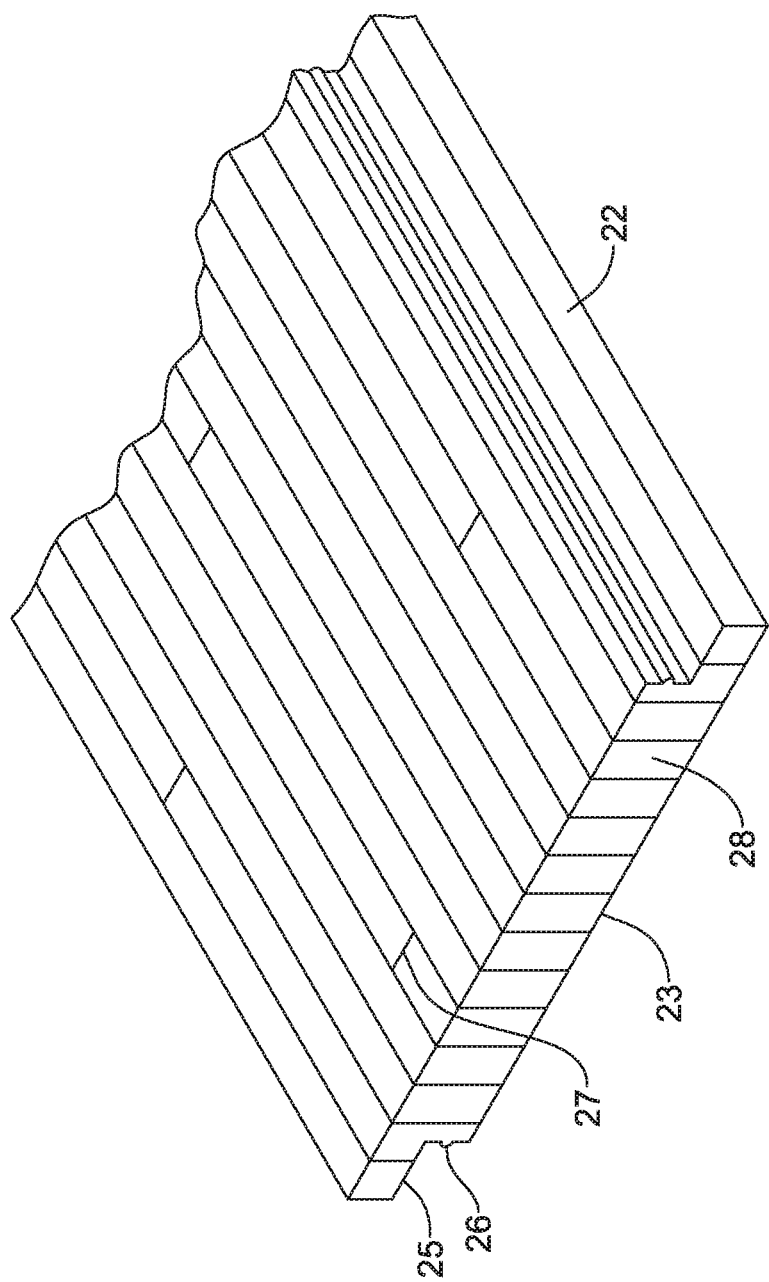
FIG. 2 is a perspective view of a traditional laminated wood floorboard with shiplaps and crusher beads.
Figure 3:
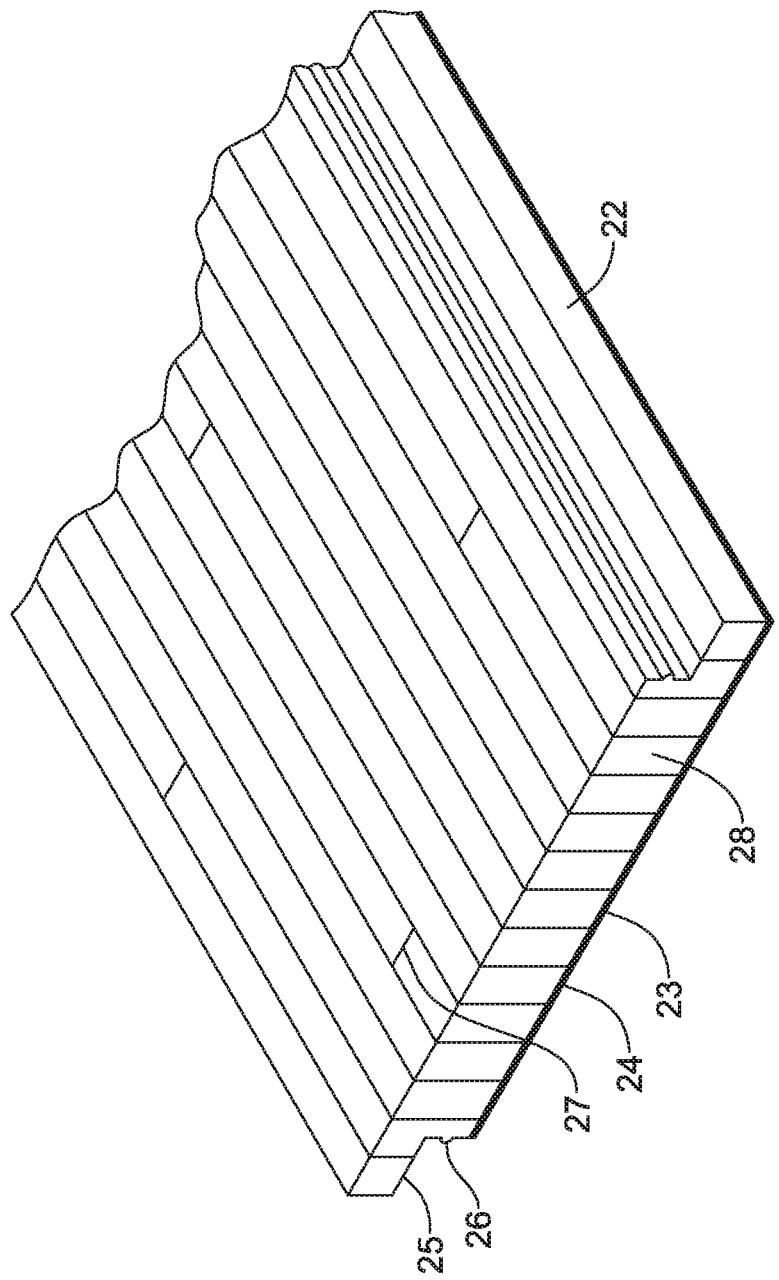
FIG. 3 is a perspective view of an FRTP-reinforced wood floorboard with shiplaps and crusher beads.

As suggested above, in at least some embodiments, flooring 10 may include one or more floorboards or wood members 22 and a reinforcing member or underlay 24 disposed along a bottom surface 23 of each wood member 22 as shown in FIGS. 1 to 3. Wood member 22 may take the form of a floor board of flooring component that is made from a suitable hardwood such as oak, maple, ash, birch, beech, aspen, elm, poplar, and the like, or any other suitable hardwood. Hardwoods may be desirable, for example, due to their high strength, stiffness, hardness, and excellent durability. Alternatively, some softer woods may also be used, where appropriate.

Wood member 22 may include a plurality of wood strips 28 that are fastened together. For example, wood strips 28 are arranged in a side-to-side and end-to-end manner in order to form wood member 22. To manufacture the individual strips 28, green (e.g., not dried) wood logs may be cut into lumber using conventional techniques. The lumber may be kiln-dried so that it has an equivalent moisture content of about 6 to 10%. Alternatively, the lumber may be seasoned or otherwise allowed to dry to the desired moisture content. The dried lumber may be sanded and planed into the desired thickness. For example, the lumber may be sanded and planed so that it has a thickness of about 0.75 to 1.5 inches, or about 1 to 1.25 inches thick. The lumber may also be cut into the desired width, for example, using a ripsaw. For example, the lumber may be cut to have a width of about 0.75 to 2 inches, or about 1 to 1.438 (e.g., 1 7/16) inches wide.

During the manufacturing of strips 28, any wood defects such as knots, cracks and fractures, bark pockets, cavities and holes by insects, decay by fungi, and stains by molds may be removed by cutting off the defects with, for example, a chop saw or suitable automatic cutting system. It can be appreciated that such cutting may alter the length of strips 28. It may be desirable for minimum length of wood strips 28 to be about 12 inches in wood member 22. Overall, the average length of wood strips 28 may be between about three and three and one-half feet.

Both of the opposing ends of each wood strip 28 may be cut into a square shape with, for example, a tennoner saw. The squared ends of wood strips 28 may also be further cut so that "hooks" are formed therein. These hooks allow wood strips 28 to be attached end-to-end by mating adjacent hooks and forming a "hook joint" 27. The depth or size of hook joint 27 may vary depending on the application. For example, the depth of hook joints 27 may be about 0.25 to 0.75 inches, or about 0.25 to 0.5 inches, or about 0.375 inches. Alternatively, any other suitable type of joint may be utilized to join together wood strips 28. In some instances, hook joint 27 may be sealed with a suitable sealing material.

The suitably prepared wood strips 28 may also be fastened together side-to-side using a suitable attachment technique. For example, the vertical sides or edges of each wood strip 28 may be coated with an adhesive by a roller glue spreader. This may help secure wood strips 28 across the width of wood member 22. A suitable adhesive for this securing may include melamine formaldehyde, urea-melamine formaldehyde, crosslinking polyvinyl acetate, isocyanate, and the like. The glue-coated wood strips 28 may be assembled (e.g., both side-to-side and end-to-end) on a conveyor. This may include manual assembly. The hook joints 27 may fasten together the adjacent ends of strips 28 to form a continuous slab, in which they are jointed end-to-end in a number of rows (as illustrated in FIG. 2). It may be desirable to control the number of hook joints 27 per square foot. For example, it may be desirable to have about 5 to 7 hook joints 27 per square foot on average. The joined collection of wood strips 28 may be placed into a steam or radio frequency hot press under vertical and cross-direction pressures for curing of the adhesive.

Once strips 28 are secured together in the desired fashion, the resultant board may be cut to the desired length. For example, the board may be cut to a length of about 16-60 feet, or 28-56 feet, or 45-54 feet, or about 56 feet (or more or less depending on the application). Such lengths may be suitable for use in, for example, a truck trailer or container. Additionally, the board may also be divided into a number of floorboards or wood members 22 that each has a width, for example, of about 10 to 14 inches or about 12 inches to 12.25 inches. These wood members 22 may be planed (and/or sanded) to a desired thickness. For example, wood member 22 may be planed to a thickness of about 1 to 1.5 inches, or about 1.125 inches, or about 1.313 inches, or about 1.375 inches, etc.

Trailers like trailer 12 may include a plurality of wood members 22 joined together to form flooring 10. For example, trailer 12 may include about 6 to 10 wood members 22, or about 8 wood members 22, or more or less depending on the application. To facilitate the joining of wood members 22, shiplaps 25 and crusher beads 26, which may be similar to those known in the art, may be machined on to both edges of each wood member 22 (FIG. 2). Shiplaps 25 may be convenient for installing floorboards on truck trailers by allowing adjacent wood members 22 to overlap. Crusher beads 26 may provide spaces between adjacent wood members 22, which may protect members 22 from buckling due to their expansion in wet conditions.

In some embodiments, bottom surface 23 of wood members 22 may be coated with a water resistant polymeric layer (e.g., latex). However, this may not be necessary when underlay 24 is utilized (FIG. 3). Wood members 22 may be sealed at both ends with a water resistant adhesive or a wax emulsion. To avoid the water or moisture penetration from both ends of reinforced wood flooring 10, a water resistant adhesive resin such as epoxy and crosslinking polyvinyl acetate may also be used at the ends of wood members 22. The top surface of wood members 22 may be optionally coated with a suitable epoxy, lacquer, wax emulsion, or varnish to improve the durability and water resistance of wood members 22 during installation and maintenance.

As indicated above, wood members 22 may include underlay 24 along bottom surface 23. Underlay 24 may be essentially water impermeable. More particularly, underlay 24 may essentially prevent water (including liquid water and/or water vapor) from passing therethrough. Accordingly, using a water impermeable underlay 24 may be desirable because it may form a water barrier at the bottom of flooring 10, where flooring 10 would otherwise be exposed to the outside environment.

In addition, underlay 24 may include a structure that may add desired strength to wood member 22. This may be desirable for a number of reasons. For example, adding strength may improve wear resistance, extend life, increase the payload of a trailer (e.g., trailer 12), etc. In at least some embodiments, underlay 24 includes a fiber reinforced thermoplastic (FRTP). An FRTP may include a plurality of reinforcing fibers that are impregnated with or otherwise include a polymeric resin or matrix. The fibers may be carbon fibers, glass fibers, aramid fibers (e.g., Kevlar® by DuPont & Co.), and the like, or mixtures and/or combinations thereof. In some cases, the fibers may be fiberglass fibers such as E-glass, S-glass, C-glass or other glass fibers. The fibers may make up about 10-80%, or about 20-70%, or about 30-60% or about 60% of the weight of underlay 24.

The polymeric resin or matrix may include one or more thermoplastic resins such as polypropylene (PP), polyethylene (PE), polyvinyl chloride (PVC), polycarbonate (PC), polyesters such as polyethylene terephthalate (PET), polyethylene terephthalate glycol (PETG), and polybutylene terephthalate (PBT), polyamide (also called nylon, e.g., nylon 6, nylon 6/6, and nylon 12), polyether ether ketone (PEEK), polyphenylene sulfide (PPS), polysulfone (PSUL), polyamide imide (PAI), polyether imide (PEI), acrylic, polyvinyl alcohol, polyacetals, ethylene vinyl acetate (EVA) or the like, or any other suitable polymeric materials. The FRTP may be manufactured according to conventional manufacturing processes such as pultrusion.

Underlay 24 may also vary in thickness. In some embodiments, underlay 24 may be about 0.003 to about 0.1 inches thick, or about 0.01 to about 0.04 inches thick, or about 0.05 to 0.09 inches thick, or about 0.030 inches thick. Underlays 24 of these thicknesses may provide a suitable degree of reinforcement while being sufficiently thin so as to reduce the overall weight of flooring 10. This may desirably impact the properties of flooring 10 by reducing the weight, which may allow for less fuel consumption when transporting goods while allowing them to carry just as much or more goods (i.e. increase payload). Furthermore, FRP underlays 24 may reinforce wood member 22 sufficiently so that wood members 22 may be further thinned, which also may desirably reduce the weight of flooring 10 while still maintaining a desirable amount of strength. In some instances, it may be desirable for underlay to add a sufficient amount of strength while still maintaining enough flexibility for wood members 22 to bend without separating from the underlay 24. For example, an underlay with a larger amount of stiffness/strength may provide good strength properties but may have a greater potential for separation, which could allow for water intrusion onto wood members 22. Therefore, a desired balance between strength and flexibility may allow flooring 10 to have superior performance without sacrificing (and even increasing) durability.

In some embodiments, underlay 24 may be attached to wood member 22 using a suitable thermosetting or thermoplastic adhesive or adhesive layer. In some instances, essentially the entire bottom surface of wood member 22 is adhesively bonded to underlay. In other instances, a discontinuous layer of adhesive and/or a discontinuous glue pattern (which may also be termed a "glueline" in the art) may be understood to be a layer of adhesive or a glue pattern that is designed to cover less than all of the surface area of bottom surface of wood members 22. For example, the discontinuous layer of adhesive may cover less than 100% of the surface area of the bottom surface of wood members 22, or about 98% or less, or about 96% or less, or about 95% or less, or about 90% or less of the surface area of the bottom surface of wood members 22. A discontinuous layer of adhesive differs from a continuous layer of adhesive (and/or continuous glueline), which is designed to cover essentially 100% of the surface area of a wood member surface. It will be appreciated that a variety of different discontinuous glue patterns are contemplated, including but not limited to those described and illustrated in U.S. Pat. No. 7,765,758, the entire contents of which are incorporated by reference in their entirety. In other instances, a continuous layer of adhesive may be utilized.

A variety of adhesives may be used. For example, illustrative thermosetting adhesives may include epoxy, polyurethane, phenol-resorcinol formaldehyde, etc., while thermoplastic adhesives may include ethylene vinyl acetate (EVA), polyamide, cyanoacrylate (CA), and hot melt polyurethane (PUR), or any other suitable adhesives. It should be noted that while the following discussion describes the use of PUR in flooring 10, this is not intended to limit the invention as essentially any other suitable adhesive may be used for the adhesive layer.

In at least some embodiments, the PUR adhesive may be placed on a reservoir adjacent a pair of heated rollers. The temperature of rollers may be controlled to be between about 250° F. and about 300° F., which may melt the PUR material. After the PUR resin is completely melted, wood members 22 may pass through a gap between the rollers and wood members 22 are coated with the PUR material. Underlay 24 may be quickly laid on the glueline (e.g., the layer of PUR material disposed on wood members 22) and pass through a pair of cool rollers (also called pinch rollers) under pressure. The pressure of the pinch rollers may be adjusted to achieve a desirable bonding strength as well as the desired distribution of adhesive (e.g., avoiding and/or limiting "pinch out" or "squeezing out" of adhesive). The resultant reinforced wood flooring 10 is stored at room temperature for 24 hours to complete further solidification and/or curing of the PUR. The FRP edges of the cured reinforced wood flooring 10 may be trimmed with a suitable cutting tool to remove any excess material. This may form the reinforced wood flooring 10 (and/or one of the floor boards making up flooring 10).

In some cases, it may be challenging to strongly bond a thermoplastic matrix onto a wood substrate since many of the commercial thermoplastics have a relatively low surface energy. Low surface energy of a substrate usually results in poor bonding by an adhesive due to the difficulty of wetting out. Accordingly, in some cases it may be desirable for an FRTP laminate to have a surface energy ranging from about 40 dyne/cm to about 50 dyne/cm. In some cases, for thermoplastic matrices which have a surface energy that is lower than 40 dyne/cm, the bonding surface of FRTP underlay 24 can be plasma- or corona-treated during manufacture of FRTP before the lamination process in order to ensure strong interfacial adhesion. Unfortunately, in some cases, the plasma- and/or corona-initiated surface energy can only last for three to six months, as the dyne level of the treated FRTP surface gradually reduces in a natural atmosphere.

Alternatively, the FRTP surface can be directly roughened by using a sanding machine or other abrasion facilities. Since in some cases FRTP is a soft material, it may not be easy to be deeply sanded like a rigid FRTSP material. Accordingly, in some cases, it may be useful to use a "micro-sanding" process, in which one of outer surfaces is slightly roughened to remove a mold release agent on the top layers of FRTP, such that the roughened surface can be used as a bonding surface for FRTP. In addition, a combination of the plasma and/or corona treatment and the "micro sanding" method may be used to achieve a better bonding outcome for FRTP.

In another alternative process, a scrim method can be used to improve the roughness of some thermoplastics. A scrim is a fabric which is attached on the outer surface of an FRTP material during manufacture. The scrim may be impregnated with the resin matrix and then solidified to become one of the outer surfaces for FRTP. The scrim method is useful for some FRTP laminates which are difficult to bond as the scrim can desirably create a roughness of FRTP after an abrasion treatment such as sanding. The roughened scrim may be used as the bonding surface of FRTP for further lamination. For instance, FRTP laminates may be bonded through the scrim by an adhesive such as hot melt PUR onto the wood member 22.

The reinforcing fibers used in the FRTP laminate may be continuous and/or discontinuous. The continuous fibers may be monofilament or multifilament. The multifilament fiber can be twisted or untwisted. Continuous fibers may be used in a pultruded or laminated structure, while discontinuous fibers may be directly mixed with the thermoplastic matrix, or formed to a planar mat by combining with a binder. Compared to the discontinuous fibers, continuous fibers are precisely controlled in fiber orientation.

However, the discontinuous fibers may have a limited length. Discontinuous fibers can be divided into two groups: One is called short fibers, while the other is called long fibers. For example, the fiber length of short fiber is usually less than 1 inch, whereas long fibers can be about 2 inches or more in length. Sometimes short fibers are also called ultrashort or milled fibers when they have a fiber length of less than 0.125 inches. The ultrashort fibers are normally suitable for injection molding and sheet extrusion applications. In addition, short fibers mostly used for discontinuous fiber-based FRTP laminates are usually recommended to have a length to diameter ratio of about 500:1 to 800:1.

The fiber architecture (e.g. the arrangement of fibers) in the underlay 24 may vary. In FRTP, the reinforcing fibers normally have a certain reinforcement format. For example, continuous fibers can exist individually as roving, filament, or strands in the thermoplastic matrix of FRTP. They can also be a plain weave, a basket weave, a till weave, a satin weave, a multi-axial weave, and the like. These weave materials are also called continuous textile fiber mats. In some weaves, the fibers are crisscrossed in 0 and 90 degree directions, respectively. Within a weave, the fiber aligned along or close to the longitudinal direction and/or the length of the weave is called "warp", while that aligned along or close to the transverse direction and/or the width of the weave is called "weft" (sometimes "woof"). In some situations, two different fibers can be woven together to form a hybrid weave. Of course, there are also other kinds of continuous fiber mats used for FRTP, including stitched fabrics, continuous random mats (CRM) which include nonwoven fabrics, knitted fabrics, braided fabrics, etc. Discontinuous fibers are usually compounded with a thermoplastic matrix and randomly distributed in FRTP sheet. A discontinuous random mat can also be pre-formed before the thermoforming process, which is usually a nonwoven fabric. A nonwoven fabric may include continuous or discontinuous fibers arranged in a two-dimensional sheet (or web). Unlike a regular cloth, it is neither woven nor stitched. Since a nonwoven fabric is low in cost and can provide effective reinforcement for some applications, it can be used as a preform in FRTP materials.

In some embodiments, most of the fibers may be oriented in the same direction (e.g., the longitudinal direction). Alternatively, some of the fibers in underlay 24 may be oriented in one direction while some of the fibers may be disposed in a different direction such as, for example, perpendicularly to those fibers. For example, underlay 24 may include about 70% or more of the fibers oriented in the longitudinal direction and the balance of them arranged perpendicular to those fibers, or about 80% or more of the fibers oriented in the longitudinal direction and the balance of them arranged perpendicular to those fibers, or about 90% or more of the fibers oriented in the longitudinal direction and the balance of them arranged perpendicular to those fibers.

In some other embodiments, underlay 24 can have a single ply or layer of FRTP material, in which the continuous fibers are orientated in the longitudinal direction (e.g., along the length of trailer 12) for the ultimate performance. Alternatively, the fibers can be discontinuous fibers (e.g., chopped fibers). The chopped fibers can be randomly distributed in a matrix and form a single layer of FRTP within the matrix. In some cases, the chopped fibers may have a length ranging from about 0.25 inches to about 4 inches.

Figure 4:
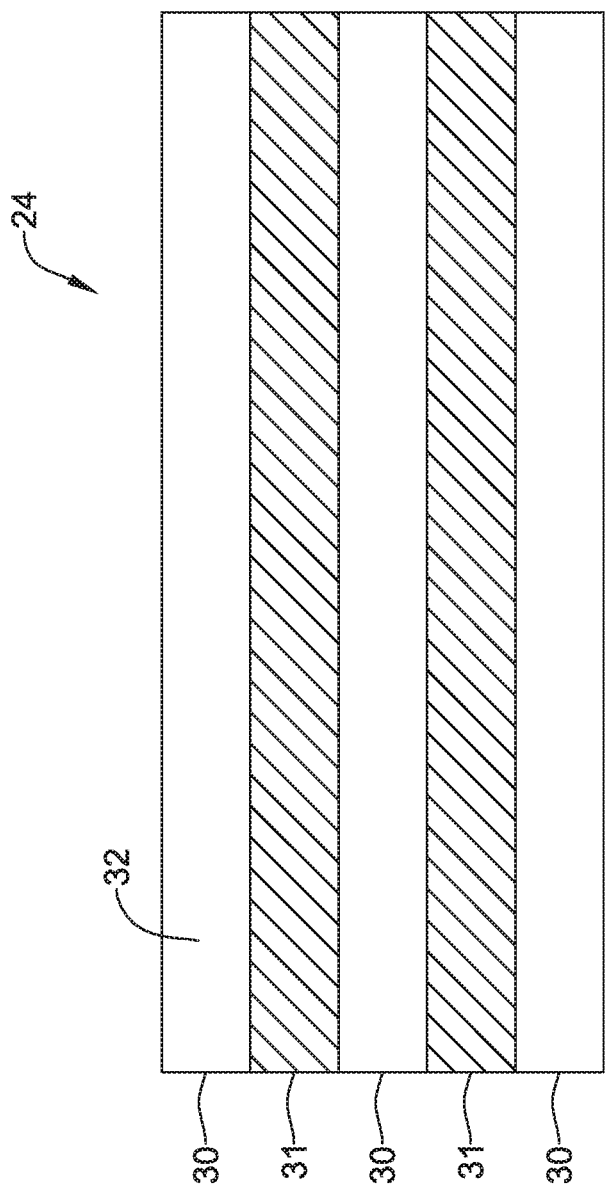
FIG. 4 is a side view for a layup of an FRTP laminate with a five-ply structure.

In some instances, underlay 24 can include a plurality of layers or plies. For example, FIG. 4 shows an example of a five-ply FRTP structure, in which all fibers are bonded by a resin matrix 32. In this example, the first, third and fifth plies 30 may be a strand mat, in which all fibers are aligned in the longitudinal direction, while the plurality of fibers in the intermediate plies 31 may be oriented in a direction different from those in adjacent plies (e.g., perpendicular to the fibers in the first, third and fifth plies 30). Alternatively, the plurality of fibers in the intermediate plies 31 (and/or the first, third and fifth plies 30) can have two dimensional (2D) or three dimensional (3D) structures. These arrangements may result in a solid and strong structure for FRTP. In some cases, the FRTP laminates may be as simple as a two-ply laminate in which the fiberglass of the outer ply or the top ply may be aligned in the longitudinal direction, while the fiberglass of the intermediate ply may be perpendicular to that in the outer ply. The intermediate ply may directly contact the wood substrate. Of course, the FRTP laminates can also be 3 plies or more (e.g., similar to that shown in FIG. 4 but with only 3 layers), depending on design and performance requirements.

Figure 5:
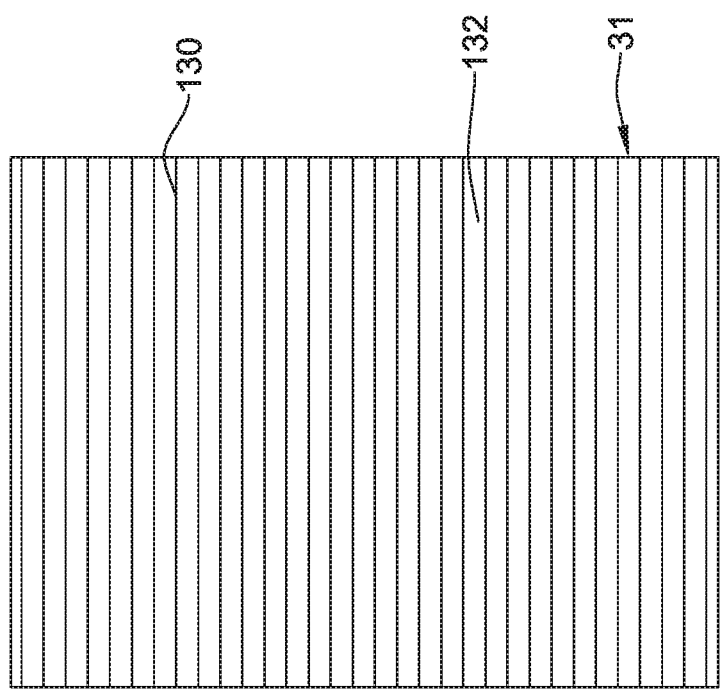
FIG. 5 is a bottom view of an intermediate ply which consists of a fiberglass strand mat with a 90° orientation of unidirectional fibers, perpendicular to the orientation of the fibers in adjacent plies.
Figure 6:
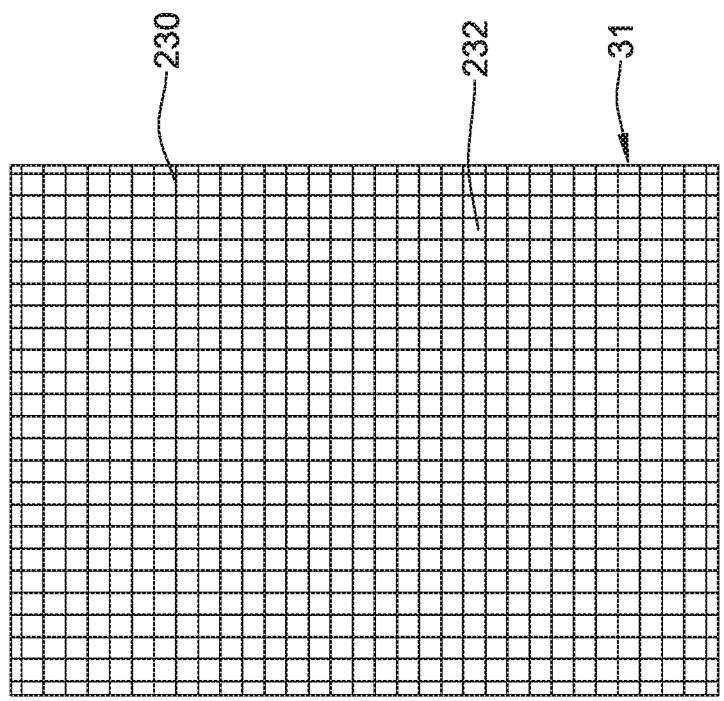
FIG. 6 is a bottom view of an alternative intermediate ply which includes a woven fabric mat of 0° and 90° crisscrossing fibers.
Figure 7:
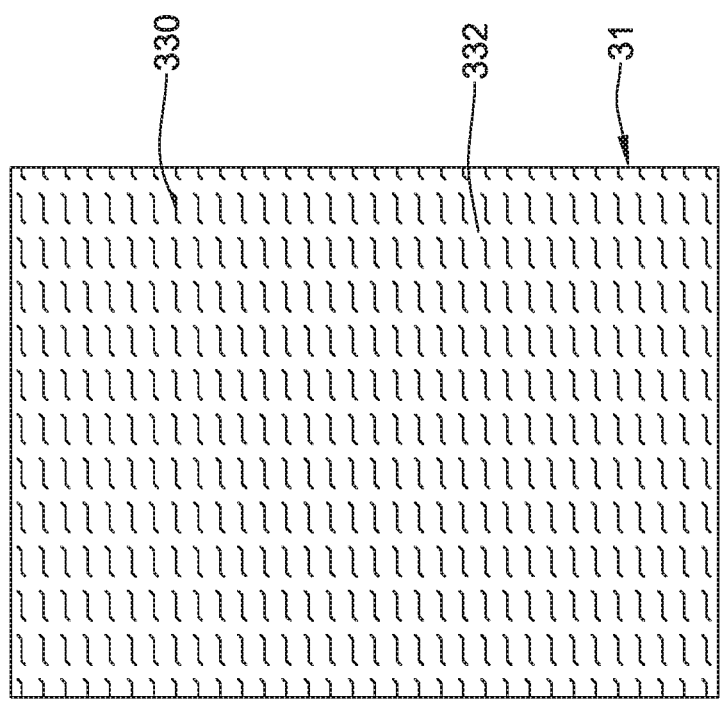
FIG. 7 is a bottom view of another example of an intermediate ply which includes a nonwoven fabric mat.

In some cases, the intermediate plies 31 may be a one-dimensional layup. As shown in FIG. 5, the intermediate plies 31 may be a strand mat 130 with continuous fibers that are arranged in an orientation angle of 90 degrees and perpendicular to the fibers in the adjacent strand mats 30 (e.g., the first, third and fifth plies) with an orientation angle of 0 degrees. Alternatively, the intermediate plies 31 may be a two- or three-dimensional layup. For example, in some embodiments, the intermediate plies 31 may be a fabric material. As shown in FIG. 6, the fibers of the strand mat 230 may be knitted with a woven structure in which they are crisscrossed with twisted 0 degree and 90 degree bidirectional orientations and are buried in the resin matrix 232. The bidirectional fibers can also extend at a relative orientation of about 30 degrees, about 45 degrees or about 60 degrees relative to those in adjacent layers. In some cases, the different braiding structures may be replaced with a stitching structure, in which strand fibers are tightly stitched with a thermoplastic tread or string such as nylon, polyester and the like at the intersections to form different bidirectional orientations. In some cases, as shown in FIG. 7, the strand fibers can use a nonwoven fabric for the intermediate plies 31. The fiber of the strand mat 330 are completely randomly distributed in the resin matrix 332.

In at least some embodiments, FRTP can be a combination of different fiber shapes, orientations, and configurations. For example, a three ply FRTP material may include a continuous strand mat for the top and bottom plies, respectively, and a nonwoven structure for the intermediate ply. Similarly, the top and bottom plies may be a continuous strand mat, respectively, while the intermediate ply may be a mat with randomly distributed discontinuous fibers. In some instances, the top and bottom plies may be a fiber mat in which the chopped fibers are arranged in the longitudinal direction, while the intermediate ply may be either a woven or a nonwoven mat.

In some instances, a hybrid fiber structure may exist in the underlay 24. For example, the underlay 24 may include a combination of glass fibers and aramid fibers. These fibers may be divided such that a ratio of glass fibers to aramid fibers, by weight, may be about 8:1 to 100:1, or about 30:1 to 80:1, or about 50:1. In some cases, an illustrative underlay 24 may include about 60-65% by weight glass fibers and about 1-10% or about 5-10% by weight aramid fibers. In a particular example, an underlay 24 may include about 63% by weight glass fibers and about 7% by weight aramid fibers. It will be appreciated that other ratios are contemplated. It will also be contemplated that while these illustrative ratios are given in terms of weight percent, it is possible to express the fiber ratios in a corresponding volume ratio.

In some cases, FRTP (thermoplastic) laminates have certain advantages compared with FRTSP (thermoset plastic) laminates. Firstly, FRTP is lighter in weight, which can reduce the weight of composite flooring and accordingly, reduce fuel costs during transportation. Secondly, FRTP provides improved mechanical properties such as toughness and chemical and water resistances. Thirdly, most of the thermosetting based FRTSP laminates require a curing step for the resin within an autoclave device, but FRTP has no curing requirements for a thermoplastic. This may provide potential automation for FRTP. Because thermoplastics tend to be softer than thermoset plastics, the desirable benefits and performance of FRTP laminates are unexpected (e.g., the performance is unexpectedly better than predicted).

As another advantage, FRTP laminates can be easily reformed and reprocessed like thermoplastics. For example, the size of FRTP sheet materials can be easily expanded by splicing two FRTP sheets together or directly end-joining two separate FRTP sheets under a high temperature and a high pressure. Unlike thermosetting based FRTSP laminates, hence, short FRTP sheet materials can be reused, thus reducing wastes and their impact to the environment. In addition, this reformable property makes it easy to form various multiple-ply FRTP products from preforms and prelaminates that are the intermediate products of FRTP laminates.

In some instances, FRTP is a flat sheet material that can be manufactured with continuous or discontinuous fibers in different thermoplastic matrices. The basic manufacturing process for FRTP includes mixing and/or compounding the fibers with a thermoplastic resin, preforming an assembly, melting the resin, and finally consolidating the composite. As aforementioned, the preforms fabricated after the preforming step are also called an intermediate product of FRTP laminates that are converted into a final product in a later processing step.

In some cases, fabrication of FRTP sheet materials includes the manufacturing processes for FRTP laminates reinforced with continuous fibers and those with discontinuous fibers. In general, an FRTP underlay 24 reinforced with continuous fibers can be manufactured by following a process for continuous fiber-reinforced composite laminates. For example, a unidirectional tow or tape process may be used to manufacture a FRTP sheet material. At the first step, creels of a reinforcing fiber such as fiberglass, carbon fiber, aramid fiber or the combination of the above fibers thereof firstly pass a spreading device in order to align the fiber's filaments in the machine direction and reduce the amount of crossovers in the transverse direction. At the same time, the spreading device helps open up the fiber bundle for better wetting out by the resin matrix during the impregnation step. The spread fiber may move into an impregnation chamber, in which the thermoplastic resin is melted as a molten polymer at a temperature of about 50-120 degrees F. higher than the melting point of the resin matrix. The assembly enters a consolidator or continuous press under a high pressure to remove any air bubbles and reduce any voids existing in the FRTP laminates. A solid FRTP sheet is formed after it is released from a series of cooling rolls. Alternatively, the fiber bundle or mat can be overlapped with a thin resin sheet on its top and bottom surface, respectively, and passed through a pair of setup rollers and a series of solidification rollers. The assembly is heated up in a heater and released after it cools down by passing through a series of cooling rolls. In some cases, a processing temperature, also referred to as a consolidating temperature, is about 50 to 120° F. higher than the melting temperature of the thermoplastic matrix resin. The cooling temperature may be controlled to be slightly higher than or close to the glass transition temperature $T_g$ of the thermoplastic resin.

Similarly to the above process, FRTP sheet materials can also be fabricated by using a pultrusion process. During pultrusion, continuous fibers fed by creels and/or spools are impregnated with a thermoplastic resin in a bath or a spray chamber. The fiberglass wetted with the resin is formed as a sheet within a heated pultrusion die under shear/compression stress. The FRTP sheet is then pulled out with a pulling device. The pulling speed usually depends upon the resin system and the size and dimension of the FRTP sheet. Finally, the resultant FRTP sheet passes through a series of cooling rollers.

In an alternative process, a melted thermoplastic matrix is fed into the contact area of two preformed fiber mats by an extruder through a nip that covers the whole width of the mats. At the same time, a sheet of the same thermoplastic resin is placed on the outer surfaces of both fiberglass mats, respectively. The assembly of the above processes enters a heat laminator and is instantly formed as a sheet material under a high temperature and a high pressure. The heat laminator normally consists of a top and a bottom steel belt conveyor, respectively (also known as a belt press). The top and bottom steel belts are heated up by a heating unit located in the top and bottom conveyor, respectively. After being fed into the open gap of both conveyors of the belt press, the layup is heated up and squeezed down under a high temperature and a high pressure until it is consolidated. Finally, the above preforms may be further laminated into a FRTP laminate with different fiber arrangements and ply structures with a laminator as aforementioned.

Alternatively, a compression or matched die molding technique can be used to produce FRTP sheet materials. The equipment of compression molding is usually a hydraulic press and can apply a pressure up to several hundred tons. Similarly to the above process, this technique is normally combined with preforms or prelaminates. Accordingly, this system is often used for the final formation or preform materials such as sheet molding compound (SMC) or bulk molding process (BMC). These preforms are often provided from an industrial supplier. Although the compression molding process is periodic, the resultant FRTP sheet is continuous. The hydraulic press usually has a single daylight opening system (i.e., one opening gap with two platens) in order to manufacture of continuous FRTP sheet materials. Finally, the resultant FRTP sheet is released from the press and rolled up for shipping.

For the above manufacturing processes for continuous fiber FRTP laminates, a good example is Polystrand Inc.'s E-glass reinforced PETG sheet material which has a sandwich structure (also see Example 1). All plies of the reinforced PETG sheet use a strand mat. The fibers in the top and bottom layers may be orientated in the longitudinal direction, while the fibers in the intermediate ply are perpendicular to those in the top and bottom layers. The flexural strength of the resultant sheet composite is about 110,000 psi in the longitudinal direction and about 40,000 psi in the transverse direction. The fiber ratio is about 60%.

FRTP laminates reinforced with discontinuous fibers may be manufactured with different processes for random fiber-reinforced sheet composites. Some typical processes are included as below, but the manufacture methods are not limited to these processes. For example, a dry process for random fiber sheet can be used to manufacture FRTP sheet materials with discontinuous fibers. This method uses a continuous melt impregnation technique in which discontinuous fibers are randomly laid down on a moving belt on which a resin is directly extruded as film. The assembly passes through a nip or belt press and is consolidated into a sheet product with a nominal thickness. Finally, the resultant sheet material is further solidified with a series of cooling rolls and cools down to room temperature.

FRTP may also be fabricated by using a water slurry manufacturing approach in which the short fibers are mixed with the resin in powder or fiber form in a papermaking machine. Since a large amount of water is used, this provides a uniform dispersion of short fibers in the assembly. During mixing, some additives such as surfactants, dispersing agents, antifoaming agents and the like may be added in the slurry to prevent segregation. The fiber/resin assembly then passes vacuum slots to remove water and may pass at least one of a forced-air dryer and an IR heater to remove additional water. Finally, the resultant sheet product passes a calender and is rolled up.

Alternatively, FRTP with discontinuous fibers can be manufactured with a sheet extrusion system. The fiber strands may be chopped into a length of about 0.25 inches and may be compounded with a thermoplastic such as nylon, PP, PVC, and other suitable thermoplastic resins. During the compounding process, a number of additives such as a dye, a coupling agent, a lubricant, and so on can be added into the mixed blend. The blends can be directly sent to the sheet extrusion system or they can be cooled down and granulated as pellets. In the sheet extrusion system, the melt is pushed through a die to form a continuous FRTP sheet material. The sheet material is rolled up after it cools down.

Eleison Composites LLC's GComp is an illustrative but non-limiting example of random fiber-reinforced sheet composites (also see Example 3). GComp is a long E-glass fiber-reinforced PP sheet material. The chopped E-glass fiber in GComp is about 2 inches to 3 inches in length, and it is randomly distributed in FRP. GComp is about 0.040 inches in thickness and has a fiber ratio of up to about 50%. The longitudinal flexural strength of GComp is in a range between about 10,000 psi to about 12,000 psi.

In some cases, it is useful for a thermoplastic matrix to maintain an appropriate flow behavior during the impregnation process. The viscosities for thermoplastics are generally higher at the processing temperature than those of the thermosets. For example, the processing temperature for PPS, PET, PP and nylon 6/6 thermoplastic are recommended to be about 600° F., about 560° F., about 400° F. and about 550° F., respectively. At the required processing temperature, the viscosity of PPS is normally about 25,000 P (e.g., Poises), while PET is about 1,300 P. For comparison, an epoxy thermoset resin is only about 1,000 P at room temperature during the impregnation process. Hence, it may be useful to use various forms of thermoplastic resins for pre-form or pre-lam manufacture in order to meet the viscosity and processing temperature challenges for the melt impregnation process. The major impregnation methods for FRTP may include dry powder, commingled fiber, slurry, direct melt or film coating, depending on the availability of the resin form, the intended end use of the intermediate form, and the overall process economics. In dry powder impregnation, the thermoplastic resin is attached on the fiber with a form of powder by a fluidization method, including direct gas fluidization, aerosolization, and electrostatic fluidization. In general, the powder size of the resin matrix is less than 8 μm since the fiber diameters are usually in the range between about 8 to about 12 μm.

In a commingled fiber impregnation process, the reinforcing fiber is intermixed with the resin in fiber form. For example, a fabric web of both fibers is mixed by texturing and interlacing the filaments of fiber bundles with the resin fibers, resulting in fiber-resin entanglement. For the slurry impregnation, the resin matrix is in a form of slurry. The resin slurry is normally a liquid, mostly water, which is used to provide the fluidization for the reinforcing fibers. The resin is then deposited on or within a unidirectional reinforcing fiber assembly. The fiber mats wetted out by the slurry impregnation is required to pass through dewatering rolls. The fiber mats are finally dried out by heating.

In the direct melt or film coating process, the resin matrix can be either deposited as a melted resin on the fiber web through a nip across the full width of the web, which is connected with an extruder or placed on both outer surfaces of the fiber web with a sheet layer of the resin, respectively. This process may be completed by using a melt-coating die, direction injection/film coating die, a pull through melt die, a coextrusion process, or the like. The assembly is then solidified under a high temperature (which is about 50° F. to about 120° F. higher than the melting point of the resin as aforementioned) and a high pressure to form a solid laminate.

In order to overcome the limitations of direct melt impregnation, solution impregnation can be applied to avoid the high viscosity of the thermoplastic resin melts. Since the resin is dissolved in special solvents, viscosities of the solutions made of the resins are almost the same as those of thermoset resins. Hence, the fiber filaments are effectively wetted out by the resin with better penetration compared with those in the previous processes, but the solvents used for solution impregnation are usually very expensive. In some embodiments, the consolidating conditions for the underlay 24 generally vary with the thermoplastic species. For example, the consolidating temperature for a polyolefin matrix is about 400° F., while it can as high as about 527° F. However, the consolidating temperature of a PPS matrix should be about 600° F. The consolidating pressure is in a range between about 150 psi to about 250 psi. After the consolidating process, the laminate material is cooled down and slit into rolls with various widths. The width of FRTP laminates can be in a range between about 6 to about 13 inches, depending on the customer's requirements. In addition, these flexible FRTP laminates can be rolled up into coils which may have a linear length up to 1,500 ft.

For most short fiber-filled FRTP sheet materials, there are about 1-8% voids or cavities in sheet depending on the performing and fabricating processes used. Even at a fiber ratio of about 60%, commingled fiber preforms and powder impregnated preforms usually have more voids in the resin/matrix structure than consolidated tape materials. For example, GComp has many voids in structure, meaning that liquid water or water vapor can easily penetrate through the voids at a standard atmosphere pressure. Hence, GComp cannot be directly used as a laminate underneath a trailer floor. In order to overcome this defect, an extra PP sheet can be laid down on the outer surface of the reinforced assembly during the consolidation step. The sealed GComp can meet the water impermeability requirement for trailer or container flooring (e.g., underlay 24) such that the flooring should not leak under a water pressure up to 20 psi for a suitable underside protection. In comparison, Polystrand's reinforced PETG sheet materials are a sandwich laminate and have few voids in structure. They do not leak even at a water pressure of 60 psi. With these voids, however, a soft and rough bonding surface of the FRTP with a PP, HDPE, or PVC matrix that is hard to bond may provide strong bonding with an adhesive such as hot melt PUR through mechanical interlocking or "glue nails" and, accordingly, such a bonding surface may have no need for sanding and other surface treatments as aforementioned.

Figure 8:
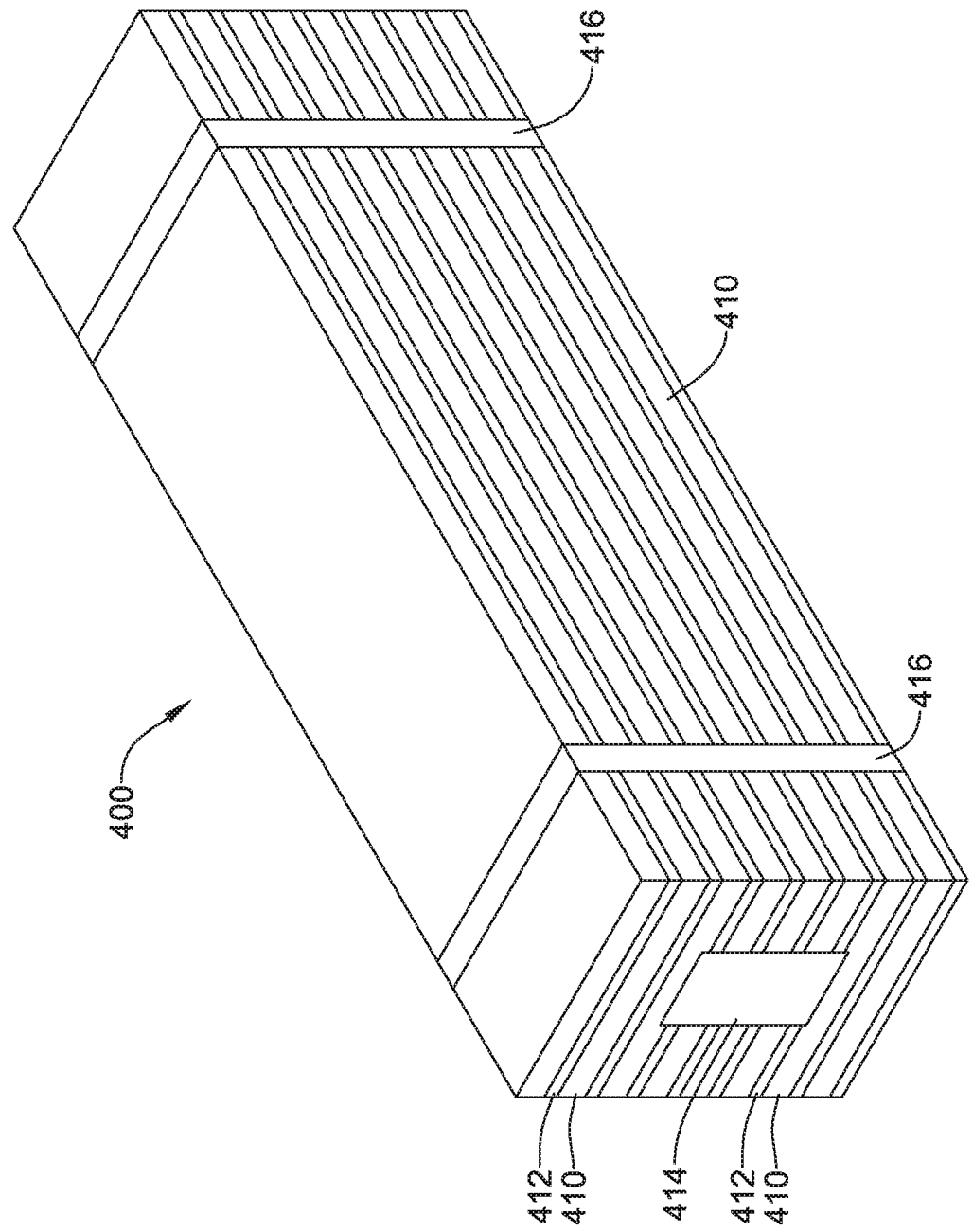
FIG. 8 is a perspective view of a floor kit.

In some cases, the composite flooring described herein may be provided commercially as a floor kit. FIG. 8, which is schematic in nature, provides a floor kit 400, in which a plurality of floor boards 410, each including an underlay 412, are stacked together along with instructions 414 (e.g., which may be stapled or otherwise secured to the floor boards 410 at one end of the floor kit 400) for their assembly and use in forming a floor for a truck trailer or a container. It can be appreciated that in practice, the form and/or shape of floor boards 410 can vary and may resemble other floor boards as disclosed herein. In some cases, the plurality of floor boards 410 may be bound together via straps or binders 416, although this is not required. In some cases, each of the floor boards 410 have a length of 16 feet or longer, or 45 to 53 feet, and are suitable for use in a truck trailer or container. In some cases, each of the underlay 412 includes a plurality of fibers disposed within a thermoplastic resin. In some instances, at least some of the underlays 412 have a thickness of about 0.1 inches or less and are designed to enhance the strength of the floor board 410 while simultaneously having a flexibility that permits the underlay 412 to flex with the floor board 410 substantially without separating from the floor board 410.

In some cases, the underlay 412 is secured to a bottom surface of the floor board 410 by adhesion. In some instances, the fibers include fiberglass fibers and the underlay 412 includes about 30 to 70 percent by weight of fiberglass. In some cases, the underlay 412 has a flexural strength of about 140,000 psi or less along a length of the floor board 410 and a flexural strength of about 60,000 psi or less along a width of the floor board 410. In some cases, the underlay 412 has a dyne level of 35 or more dyne/cm in surface energy.

In some embodiments, the plurality of fibers are arranged in a plurality of layers including a first layer where a first portion of the plurality of fibers are substantially aligned along a length of the floor board 410 and a second layer where a second portion of the plurality of fibers are substantially aligned across a width of the floor board. Sometimes, the plurality of layers includes a third layer where a third portion of the plurality of fibers are substantially aligned along the length of the floor board 410.

In some cases, each of the floor boards 410 has a strength in a three point bending test that fails at a flexural load of about 2,000 to 12,000 pounds of force, or about 6,000 to 10,000 pounds of force, or about 6,000 to 8,000 pounds of force. It will be appreciated that the load at failure will vary along in accordance with the thickness of the floor boards 410. Table One provides illustrative data, comparing a wood floor board with a fiberglass-reinforced PETG underlay that is made in accordance with the disclosure with a standard oak floor board.

TABLE ONE

| Floorboard thickness (inch) | Load at failure (lbs) | | Strength increase rate (%) |
|---|---|---|---|
| | inventive floor | standard oak | |
| 1.000 | 2750 | 2350 | 17.0 |
| 1.125 | 4800 | 3600 | 33.3 |
| 1.188 | 5800* | 4250* | 36.5 |
| 1.250 | 6650 | 4800 | 38.5 |
| 1.313 | 7500* | 5300* | 41.5 |
| 1.375 | 8400* | 5800* | 44.8 |
| 1.500 | 9850 | 6800 | 44.9 |

*Denotes production data obtained from production samples. Other values represent estimates obtained from extrapolating from and/or interpolating between production data values.

The wood substrate of the above composites was a laminated oak floorboard in which the wood strips had a width of about 0.935 or about 1.17 inches. All reinforced and unreinforced floor board samples had a width of about 11.938 inches and a length of about 3 feet. Before a three-point bending test, all test samples were placed at room conditions for 72 hrs. The flexural span was set to be 30 inches in accordance with the Fruehauf industry standard. During the bending test, the crosshead speed was controlled to be about 0.5 inch/min.

At an equivalent reinforcing fiber ratio, an FRTP laminate is cheaper in price than FRTSP laminate because a thermoplastic resin is usually lower in cost than a thermoset. For instance, the price of PET, PETG and PP is in a range of between about $1.00 to $1.10 per pound in the current market, while a thermoset epoxy resin costs about $2.86 per pound. At the thickness of 0.030 inches, FRTP laminate with 40% PETG or PET and that with 50% PP are estimated to be about $0.70 and $0.55 per square foot (sq ft), respectively. However, the cost of 0.050 inch-thick FRSTP laminates with about 25% to 30% epoxy is in a range of between about $1.50 to $2.00/sq ft. By estimation, hence, composite flooring with FRTP laminates can save by about 50% to 65% in cost compared with that with FRTSP laminates at the same floorboard thickness.

EXAMPLES

The disclosure may be further clarified by reference to the following Examples, which are intended to illustrate but not limit the disclosure in any fashion.

Example 1

A suitable FRTP laminate may include 40-70 percent by weight, or 60 percent by weight, of fiberglass. The FRTP laminate includes a three layer structure with over 60 percent of the fiberglass fibers oriented in a longitudinal direction. The FRTP laminate includes PET, PETG, nylon, or other thermoplastic resins. The fiberglass fibers in the top and bottom layers are continuous fibers that are oriented longitudinally, while the fibers in the intermediate layer are perpendicular to the fibers in the adjacent layers. The FRTP has a nominal width of 6-14 inches, or 12 inches, a nominal thickness of 0.025 to 0.045 inches, or 0.015 to 0.040 inches, or 0.030 inches, and a nominal unit weight of between about 0.2 to 0.3 lbs/ft$^2$, or about 0.25 lbs/ft$^2$. The FRTP has a longitudinal flexural strength of between about 100,000 and 110,000 psi and a longitudinal flexural modulus of between about 4.5 to 6 Msi. Both surfaces of FRTP are smooth and flat, which have a dyne level in a range between about 40 dyne/cm to about 50 dyne/cm in surface energy. The FRTP sheet is bonded to the wood via a hot melt PUR.

Example 2

Another suitable FRTP laminate may include 15-30 percent, or 25 percent of fiberglass. The FRTP laminate includes a single layer structure with a continuous textile fiberglass mat. The FRTP laminate includes PP, HDPE, PVC or other thermoplastic resins. The FRTP has a nominal width of 6-14 inches, or 12 inches, a nominal thickness of between about 0.030 to 0.090 inches, or about 0.040 to 0.070 inches, or 0.050 inches, and a nominal unit weight in a range between about 0.20 to 0.50 lbs/ft$^2$. The FRTP has a tensile strength of between about 30,000 to 35,000 psi and a tensile modulus of about 1.5 Msi. The FRTP sheet is bonded to the wood via hot melt PUR. The bonding surface of this FRTP material is rough and has many voids, which may provide strong interfacial bonding with hot melt PUR.

Example 3

Another option of FRTP laminate may include 30-60 percent, or 50 percent, of fiberglass. The FRTP laminate includes a single layer structure with discontinuous glass fibers. The length of discontinuous fibers is in a range of between about 0.125 to 4 inches. The FRTP laminate includes PP, HDPE, PVC or other thermoplastic resins. The fiberglass fibers are randomly distributed in the FRTP laminate. The FRTP has a nominal width of 6-14 inches, or 12 inches, a nominal thickness of between about 0.020 to 0.050 inches, or about 0.025 to 0.045 inches, or about 0.030 inches, and a nominal unit weight of between about 0.24 to 0.30 lbs/ft$^2$. The FRTP has a tensile strength of 8,000 to 15,000 psi and a tensile modulus of between about 1.0 to 2.0 Msi. The FRTP sheet is bonded to the wood via hot melt PUR. Similarly to Example 2, the bonding surface of this FRTP material is soft and rough. In addition, it has many voids, which may provide strong interfacial bonding with hot melt PUR.

Example 4

In Table 2, the first to the fourth groups are composite wood floors reinforced with E-glass fiber, while the fifth group is a composite wood floor without E-glass reinforcement. The sixth and seventh groups are conventional wood flooring used as controls, whose mechanical properties are based on average values by production, respectively. In addition, the first to the third groups and the fifth group are composite flooring with a thermoplastic-based laminate, while Group No. 4 is a composite floor with a thermoset-based laminate. Among the first to the fourth groups, the third group is a composite wood floor containing chopped E-glass fiber, whereas the rest are composite wood floors containing continuous E-glass fiber. The E-glass fiber ratio for the first to the fourth groups is about 60%, 60%, 50%, and 85%, respectively. The reinforced PETG laminates in the first and second groups have a longitudinal flexural strength in a range between about 110,000 psi to about 120,000 psi, respectively, while the reinforced PP laminates in Group No. 3 have a longitudinal flexural strength of about 10,000 psi.

TABLE TWO

| Sample group | Board quantity | FRP type | FRP thickness (inch) | Nominal board thickness (inch) | Load at failure (lbf) | Deflection at failure (inch) | Strength increase compared to wood (%) |
| --- | --- | --- | --- | --- | --- | --- | --- |
| 1 | 6 | E-glass filled PETG | 0.025 | 1.188 | 6102 | 1.971 | 41.9 |
| 2 | 3 | E-glass filled PETG | 0.030 | 1.313 | 6900 | 1.940 | 35.3 |
| 3 | 4 | E-glass filled PP | 0.040 | 1.313 | 5749 | 1.592 | 13.6 |
| 4 | 6 | E-glass filled epoxy | 0.050 | 1.313 | 10626 | 3.587 | 108.4 |
| 5 | 4 | PP without filler | 0.035 | 1.188 | 4157 | 1.670 | −3.3 |
| 6 | — | control | — | 1.313 | 5100 | 1.050 | — |
| 7 | — | control | — | 1.188 | 4300 | 1.200 | — |

For this Example, the tested composite wood floorboards had a dimension of 3 ft by 1 ft and were placed at room temperature for 72 hours prior to the flexural test. In accordance with the Fruehauf industry standard, a three-point bending test was conducted for all sample boards by a universal test machine. The flexural span for each floorboard sample was set to be 30 inches. During the test, the crosshead speed was set to be about 0.5 inches/min.

Table 2 shows the flexural properties of composite wood floorboards with different plastic laminates. For epoxy-based FRTSP laminates, the load at failure of the 1.313 inches thick composite floorboard was as high as 10,626 lbf and about 108% higher than that of conventional standard oak at the same board thickness. For thermoplastic based FRTP laminates, the load at failure of 1.313 inches composite floorboards with E-glass filled PETG and with E-glass filled PP had a maximum flexural load of 6,900 lbf and 5,749 lbf, respectively, which had a strength increase rate of 35.3% and 13.6%, respectively, compared with the unreinforced wood flooring at the same board thickness. For 1.188 inches composite wood floorboards with E-glass filled PETG, the load at failure was as high as 6,102 lbf, which was about 42% higher than that of conventional wood floorboards without filler at the same board thickness. Therefore, 1.188 inches E-glass reinforced composite floorboards were much stronger than conventional wood floorboards and the composite floorboards without filler at the same board thickness. In contrast, 1.188 inches composite floorboards without filler which use a 0.040 inch PP laminate were about 3% lower in bending strength than the conventional wood flooring at the same board thickness (Table 2).

As can be seen, fiber shape and ratio of FRP laminates play a very important role in improving mechanical performance of composite wood flooring. For example, the higher the fiber ratio in FRP is, the higher the flexural strength of the resultant composites. According to Table 2, 1.313 inches wood composites reinforced with E-glass/epoxy laminates were much higher in flexural strength than those reinforced with E-glass/PETG and with E-glass/PP, respectively, at the same board thickness because the former used a higher fiber ratio and a thicker laminate than the latter two. At a close fiber ratio, however, the flexural strength of 1.313 inches composite wood floorboards reinforced with E-glass/PP laminates were only about 83% of that of composites reinforced with E-glass/PETG laminates even though the former also used a thicker FRP laminate. This may be attributed to the fact that the former used discontinuous fibers, while the latter used continuous fibers.

Table 2 also indicates that the fiber type has a significant impact on the mechanical performance of FRP-reinforced composite wood flooring. Within the same PETG matrix, the first group had a higher strength increase rate than the second group compared with the corresponding unreinforced wood flooring, respectively, although the former has a thinner FRTP laminate and a thinner wood substrate than the latter. The strength difference between these two groups may be due to the fact that a stronger fiberglass was used in the first group. The fiber in the first group is about 20% stronger than that in the second group.

The plastic matrix type may also influence the reinforcing effect of FRP on a wood substrate. As shown in Table 2, a thermoset epoxy matrix has better adhesion with a fiber than a thermoplastic PETG or PP matrix because the former has better wetting out of the fiber than the latter and can penetrate into the fiber. As aforementioned, the viscosity of PETG and PP matrices at their melting temperature is at least ten times higher than that of epoxy at room temperature. Hence, it is very difficult for PETG to completely wet out the fiberglass within a short processing time. Moreover, epoxy can provide a strong chemical bonding at the fiber-matrix interface, while PETG and PP only has a mechanical link with the fiber at the interface.

It is shown that the E-glass reinforced composite floorboards are not only higher in flexural strength than conventional wood floorboards, but they are also more flexible than the conventional ones (Table 2) as indicated by relative deflection. Although the floorboards sealed with polypropylene laminates do not improve the flexural strength, they are also more flexible than conventional ones. Hence, the strength and stiffness properties of composite flooring with an FRTP laminate are between those of composite flooring with FRTSP and conventional oak flooring.

Example 5

Figure 9:
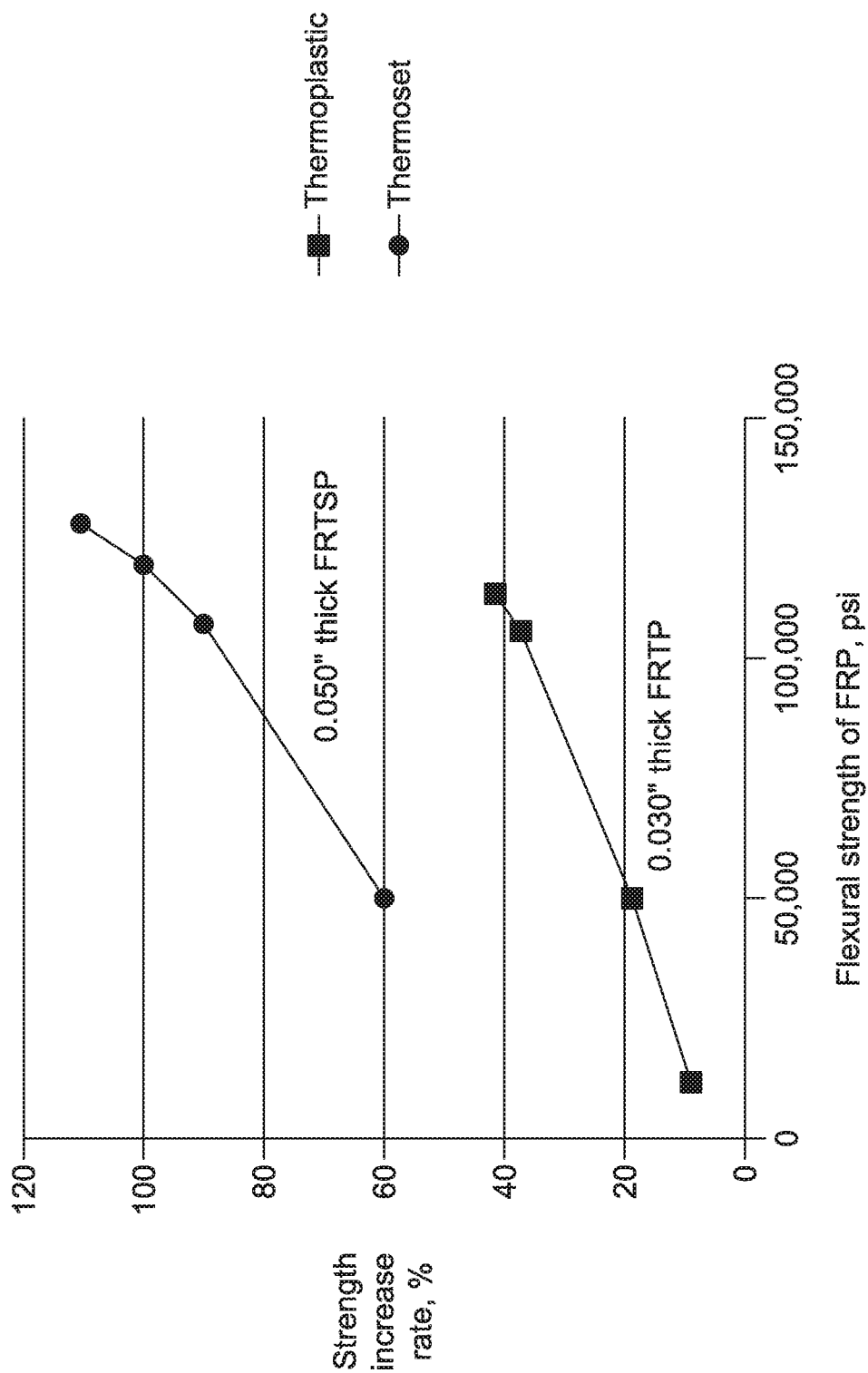
FIG. 9 is a graph illustrating a relationship between the flexural strength of an FRP underlay at different thicknesses and structures, and the strength increase of FRP-reinforced wood flooring versus conventional wood flooring at the same board thickness.

FIG. 9 summarizes the relationship between the flexural strength of an FRP laminate at different thicknesses and structures and the strength increase rate of FRP-reinforced wood flooring over conventional wood flooring. FRTP underlay usually has a lower reinforcing performance than FRTSP underlay. That is, composite floorboards with an FRTP laminate have a lower flexural strength than those with an FRTSP laminate. As aforementioned, it usually takes longer time to manufacture thick FRTP materials. Accordingly, thin FRTP is normally used for lamination in order to balance its production yield and reinforcing performance. In this example, the thickness of FRTSP used was about 0.050 inches, while FRTP was about 0.030 inches in thickness.

FIG. 9 also shows that the slope of the strength increase for the FRTSP-reinforced flooring (e.g., the strength increase rate) was relatively steep, while the slope of the strength increase for the FRTP-reinforced flooring (e.g., the strength increase rate) was relatively flat. For 0.050 inch thick FRTSP laminates, the flexural strength of the resultant 1.313 inch composite flooring was increased by a rate ranging between about 60% to about 110% compared to conventional wood flooring at the same board thickness when the longitudinal flexural strength of FRTSP laminates was between about 50,000 psi to about 130,000 psi. Moreover, the higher the flexural strength of an FRTSP laminate, the higher the strength increase rate. For 0.030 inch FRTP laminates, however, the flexural strength of the resultant 1.188 inch thick composite flooring was increased by a lower rate which was in a range between about 10% to about 50% compared with conventional wood flooring at the same board thickness when the flexural strength of FRTP laminates was in a range between about 1,000 psi to about 130,000 psi (FIG. 9).

Even with the same flexural strength, an FRTSP laminate had a higher strength increase over conventional wood flooring than an FRTP laminate. For example, the flexural strength of wood flooring reinforced with 0.050 inch FRTSP was increased by about 90% compared with that of conventional wood flooring when the FRTSP has a flexural strength of about 110,000 psi in the longitudinal direction. However, the flexural strength of wood flooring reinforced with 0.030 inch FRTP which has the same flexural strength was increased only by about 35% compared with that of conventional wood flooring (FIG. 9). Hence, FRTP laminates had a lower impact on the increased strength of the resultant reinforced wood flooring than FRTSP laminates. In addition, the strength increase rate of FRTP reinforced wood flooring was about 40% to about 60% lower than that of FRTSP reinforced wood flooring at the same board thickness.

Example 6

In order to evaluate the bonding durability of hot melt PUR at the interface between the FRTP thermoplastic and wood, a weathering resistance test for FRTP-reinforced wood flooring was developed with an accelerated laboratory environment. This weathering resistance test is very similar to the wet shear test required by the Fruehauf industry standard. For this example, all wood composite floorboard samples were submerged in water for 24 hours, at least one inch below the water surface and were then dried at 140° F. for 8 hrs. in a lab oven. After that, the composite samples were soaked again in water for 16 hrs at room temperature. Each procedure of 8 hr drying and 16 hr soaking was counted as one cycle for this test. The drying and soaking cycle was repeated until some defects or failure occurred on any one of the composite samples.

For this example, three batches of FRTP- and FRTSP-reinforced floorboard samples were prepared and tested. Among them, the composite floorboard samples with FRTSP were made by one of the trailer flooring manufacturers in the market. The nominal thickness of FRTSP laminates bonded on the wood substrate was about 0.055 inches. The FRTSP laminate was white in color. All composite floorboard samples with FRTP were made by Industrial Hardwood Products, Inc. The FRTP materials were PETG-based laminates with a black color appearance. The nominal thickness of FRTP laminates was about 0.030 inches and all the composite floorboard samples had a nominal thickness of 1.188 inches.

For each test sample, the top wood surface had no reinforcement, while the bottom surface was attached with FRP laminates. Before the experiment, the composite floorboard samples were placed at room conditions for 72 hrs. The composite floorboard samples were cut into different dimensions. In addition, the FRP overlays on the bottom surface were cut off to wood with different patterns of cut lines by a table saw. In the first batch, there were two composite floorboard samples with a dimension of 10 inches by 4.5 inches. On the bottom surface, each composite sample had two ⅛ inches longitudinal cut lines cut through the FRP laminate to wood. However, there were no cut lines on the top surface. For these two composite samples, one was a white FRTSP-reinforced oak floorboard, while another was a black FRTP-reinforced oak floorboard. Before the soaking-drying procedures, all ends of both composite samples were completely sealed with a water resistant wood coating.

After the 13th cycle, the FRTSP-reinforced floorboard became warped, with deep cracks in most of the gluelines. A number of cracks were developed on the top surface, edges and ends, indicating that high stress might exist in the FRTSP composite sample due to the unbalance board structure of thick FRTSP sheet-reinforced composite flooring. After 13 cycles, the FRTP-reinforced floorboard was still flat and the FRTP sheet was intact. In addition, there were few cracks on all the wood surfaces. After passing the 23rd cycle, the FRTP composite sample started warping, but the FRTP sheet was still intact. The longitudinal cracks were developed along all gluelines on the top surface of the FRTSP composite sample and also seen at both ends. Even after the 23rd cycle, the FRTP reinforced floorboard had few visible cracks on edges, ends and top surfaces compared with the FRTSP-reinforced floorboard which was only passed 13 cycles.

In the second batch, there were a total of four composite floorboard samples. Each sample had a dimension of 4.5 inches by 5.5 inches. One test sample was a white FRTSP-reinforced oak floorboard, while the others were a black FRTP-reinforced oak, ash, and maple floorboard, respectively. Each composite floorboard sample had two ⅛ inch wide by 1/16 inch deep longitudinal cut lines on the bottom surface and three ⅛ inch wide by 1/16 inch deep longitudinal cut lines on the top surface, respectively. After the 13th cycle, the FRSTP-reinforced oak floorboard was warping, but the FRTSP sheet was intact. Some cracks were seen along the gluelines and at both ends of the above floorboards. After 13 cycles, all the FRTP composite floorboards were flat. Moreover, the FRTP sheet was intact. For the FRTP composite ash floorboard, there were no visible cracks at the gluelines and at both ends. There were no cracks at the gluelines of the FRTP composite oak floorboard, but some tiny cracks existed at its both ends. For the FRTP composite maple floorboard, however, shallow cracks along most of the gluelines and at its both ends were clearly seen. Furthermore, the FRTP sheet on the maple substrate was wavy after the $13^{th}$ cycle. This may indicate that maple species has relatively low dimensional stability when it encounters water compared with oak and ash species.

In the third batch, there were a total of ten composite samples. Different from the samples in the first and second batches, the samples in the third batch had crisscross cutting on the FRP sheet at the bottom surface. The composite samples of the third batch were divided into two subgroups. The first subgroup included two white FRTSP-reinforced oak floorboards and two black FRTP-reinforced oak floorboards. All the composite samples were 7 inches by 6 inches in dimension. On the bottom surface, the crisscrossing cut lines formed a number of 1.25 inch by 1.25 inch FRP blocks. During the soaking and drying process, these crisscrossing cut lines provided high stress to debond the FRP sheet from wood under the accelerated test conditions. The second subgroup consisted of six composite samples with a dimension of 5 inches by 6 inches, including three white FRTSP-reinforced oak floorboards and three black FRTP reinforced oak ones.

In both subgroups, FRP blocks with different dimensions on the bottom surface of each composite sample were formed by the crisscrossing cut lines. For example, the FRTSP blocks with crisscrossing cut lines were 1 inch by 1 inch, 1 inch by 1.25 inches, 1.5 inches by 2 inches in dimension for the FRTSP-reinforced oak floorboards in the first subgroup, while the FRTP blocks were 0.75 inches by 0.75 inches, 0.75 inches by 1.25 inches, and 1.25 inches by 2 inches in dimension for the FRTP reinforced oak floorboards in the second subgroup. In general, the smaller the FRP blocks, the higher the debonding stress at the FRP-wood interface.

For the first subgroup, the top surface of all composite samples had three ⅛ inch wide and ⅛ inch deep longitudinal cut lines, which was used to reduce the debonding stress at the interface. However, only the FRTP reinforce oak floorboard which had 0.75 inch by 0.75 inch crisscross-cut lines on FRTP had three ⅛ inch wide by ⅛ inch deep longitudinal cut lines on the top surface.

After 14 cycles, three 1.25 inch by 1.25 inch FRTSP blocks were popped off for one of the FRTSP reinforced oak floorboards in the first subgroup, which accounted for 21% of the whole FRTSP blocks. However, there was no popping off or delamination for both FRTP-reinforced floorboards after the 14th cycle. In addition, both FRTSP reinforced floorboards were warping and had serious cracks along the gluelines, but both FRTP-reinforced ones were still flat with few visible cracks at the gluelines on wood.

In the second subgroup, the FRTSP-reinforced oak floorboard with 1 inch by 1 inch crisscrossing cut lines was delaminated at one glueline after the 5th cycle, while the FRTSP-reinforced floorboard with 1 inch by 1.5 inch crisscrossing cut lines had serious delamination at its three glue lines after it passed the 15th cycle. Although the FRTSP-reinforced floorboard with 1.5 inch by 2 inch crisscrossing cut lines passed 14 cycles, it was warping and had deep cracking along most gluelines. In contrast, none of the three FRTP-reinforced floorboards had any delamination at the gluelines and all were flat without visible cracks on wood. In addition, both of the FRTSP-reinforced floorboards without stress release line on the top surface had almost the same dimensional stability as that with three longitudinal cut lines which had 0.75 inch by 0.75 inch FRTP blocks on the bottom surface 23.

Accordingly, the above weathering resistance tests indicate that FRTP-reinforced wood floorboards have the same bonding durability at the wood-FRP interface as FRTSP-reinforced wood floorboards. Moreover, the former has a better dimensional stability than the latter because the FRTP underlay is more flexible and thinner than the FRTSP underlay.

It should be understood that this disclosure is, in many respects, only illustrative. Changes may be made in details, particularly in matters of shape, size, and arrangement of steps without exceeding the scope of the invention. The invention's scope is, of course, defined in the language in which the appended claims are expressed.

We claim:

1. A reinforced wood flooring for use in a vehicle, trailer, or container, the reinforced wood flooring comprising:
   a floorboard having a bottom surface, a width, and a length;
   an underlay attached to the bottom surface of the floorboard, the underlay comprising a first layer including a first plurality of fibers disposed within a thermoplastic material;
   wherein the underlay has a first flexural strength substantially along a first direction of the floorboard and a second flexural strength substantially along a second direction of the floorboard;
   wherein the first flexural strength and the second flexural strength of the underlay are designed to strengthen the floorboard while simultaneously having a flexibility that allows the underlay to flex with the floorboard substantially without at least partially separating from the floorboard.

2. The reinforced wood flooring of claim 1, wherein the first plurality of fibers in the first layer include continuous fibers.

3. The reinforced wood flooring of claim 1, wherein the first plurality of fibers in the first layer include discontinuous fibers.

4. The reinforced wood flooring of claim 1, wherein the first plurality of fibers in the first layer include randomly distributed fibers.

5. The reinforced wood flooring of claim 1, wherein the first plurality of fibers in the first layer are substantially aligned with a longitudinal axis of the floorboard.

6. The reinforced wood flooring of claim 1, wherein the underlay includes a second layer.

7. The reinforced wood flooring of claim 6, wherein the second layer includes an adhesive.

8. The reinforced wood flooring of claim 6, wherein the second layer includes a thermoset material.

9. The reinforced wood flooring of claim 6, wherein the second layer includes a second plurality of fibers and a thermoplastic material.

10. The reinforced wood flooring of claim 9, wherein the second plurality of fibers are substantially aligned with a longitudinal axis of the floorboard.

11. The reinforced wood flooring of claim 9, wherein the first plurality of fibers are oriented in a first direction and wherein the second plurality of fibers are oriented in a second direction that is substantially normal to the first direction.

12. The reinforced wood flooring of claim 1, wherein the underlay is attached to the floorboard with an adhesive.

13. The reinforced wood flooring of claim 1, wherein the first plurality of fibers include inorganic fibers.

14. The reinforced wood flooring of claim 1, wherein the first plurality of fibers includes organic fibers.

15. A reinforced wood flooring for use in a vehicle, trailer, or container, the reinforced wood flooring comprising:
    a floorboard having a bottom surface, a width, and a length;
    an underlay attached to the bottom surface of the floorboard;
    wherein the underlay includes a plurality of substantially longitudinally distributed fibers disposed within a thermoplastic material;
    wherein the underlay has a first tensile strength substantially along the length of the floorboard and a second tensile strength substantially along the width of the floorboard;
    wherein the first tensile strength and the second tensile strength of the underlay are designed to strengthen the floorboard while simultaneously having a flexibility that allows the underlay to flex with the floorboard substantially without at least partially separating from the floorboard.

16. A reinforced wood flooring for use in a vehicle, trailer, or container, the reinforced wood flooring comprising:
    a floorboard having a bottom surface, a width, and a length;
    an underlay attached to the bottom surface of the floorboard, the underlay comprising a plurality of layers including a first layer and a second layer;
    wherein the first layer includes a first plurality of fibers disposed within a thermoplastic material;
    wherein the second layer includes an adhesive;
    wherein the underlay has a first flexural strength substantially along a first direction of the floorboard and a second flexural strength substantially along a second direction of the floorboard;
    wherein the first flexural strength and the second flexural strength of the underlay are designed to strengthen the floorboard while simultaneously having a flexibility that allows the underlay to flex with the floorboard substantially without at least partially separating from the floorboard.

17. The reinforced wood flooring of claim 16, wherein the first plurality of fibers in the first layer include continuous fibers.

18. The reinforced wood flooring of claim 16, wherein the first plurality of fibers in the first layer include discontinuous fibers.

19. The reinforced wood flooring of claim 16, wherein the first plurality of fibers in the first layer include randomly distributed fibers.

20. The reinforced wood flooring of claim 16, wherein the first plurality of fibers in the first layer are substantially aligned with a longitudinal axis of the floorboard.

* * * * *